United States Patent [19]

Brenza

[11] Patent Number: 4,905,141
[45] Date of Patent: Feb. 27, 1990

[54] PARTITIONED CACHE MEMORY WITH PARTITION LOOK-ASIDE TABLE (PLAT) FOR EARLY PARTITION ASSIGNMENT IDENTIFICATION

[75] Inventor: James G. Brenza, Putnam Valley, N.Y.

[73] Assignee: International Business Machines Corporation, Armonk, N.Y.

[21] Appl. No.: 265,316

[22] Filed: Oct. 25, 1988

[51] Int. Cl.[4] .............................................. G06F 9/00
[52] U.S. Cl. .............................. 364/200; 364/243.41; 364/243.42; 364/243.43; 364/243.44; 364/243.45
[58] Field of Search ... 364/200 MS File, 900 MS File

[56] References Cited

U.S. PATENT DOCUMENTS

| | | | |
|---|---|---|---|
| 4,004,278 | 2/1977 | Nagashima | 364/200 |
| 4,075,686 | 2/1978 | Calle et al. | 364/200 |
| 4,264,953 | 4/1981 | Douglas et al. | 364/200 |
| 4,268,907 | 5/1981 | Porter et al. | 364/200 |
| 4,371,929 | 2/1983 | Brann et al. | 364/200 |
| 4,429,363 | 1/1984 | Duke et al. | 364/200 |
| 4,430,712 | 2/1984 | Coulson et al. | 364/300 |
| 4,433,374 | 2/1984 | Hanson et al. | 364/200 |
| 4,437,155 | 3/1984 | Sawyer et al. | 364/200 |
| 4,466,059 | 8/1984 | Bastian et al. | 364/200 |
| 4,493,026 | 1/1985 | Olnowich | 364/200 |
| 4,500,954 | 2/1985 | Duke et al. | 364/200 |
| 4,502,110 | 2/1985 | Saito | 364/200 |
| 4,503,501 | 3/1985 | Coulson et al. | 364/300 |
| 4,635,194 | 1/1987 | Burger et al. | 364/200 |
| 4,663,742 | 5/1987 | Anderson et al. | 364/900 |
| 4,719,568 | 1/1988 | Carrubba et al. | 364/200 |
| 4,725,945 | 2/1988 | Kronstadt | 364/200 |

Primary Examiner—Raulfe B. Zache
Assistant Examiner—John G. Mills
Attorney, Agent, or Firm—Bernard M. Goldman

[57] ABSTRACT

A CPU has N-1 ports for concurrently making memory requests and transferring data using a cache with M partitions. Each partition includes a cache directory partition and a corresponding cache data store partition. Each port has a Partition Look-Aside Table (PLAT). Each PLAT has multiple entries that store the most-recent valid memory requests made by its CPU port. A PLAT entry includes a cache partition identifier, a control field, and a congruence-class address for locating associated data in the identified partition. Simultaneous cache accessing in up to N-1 different partitions may be made by N-1 CPU requests have PLAT local hits. The Nth port services global cache misses. An address switch simultaneously connects the CPU requests to up to N different partitions. A PLAT "local hit" occurs when a CPU request equals PLAT valid entry, enabling immediate accessing of the requested data in the identified partition. A PLAT "miss" generates a "global" request sent to all partitions. If the global request is found in any partition, a global "hit" occurs, and the data is transferred to the requesting CPU port through a data bus switch, and the port's PLAT is validated. If the global request is not found in any partition, a global "miss" occurs, which is sent to the system memory hierarchy for a data fetch; LRU circuits select a partition for receiving the data fetch, and a new PLAT entry is generated for the requesting port.

24 Claims, 17 Drawing Sheets

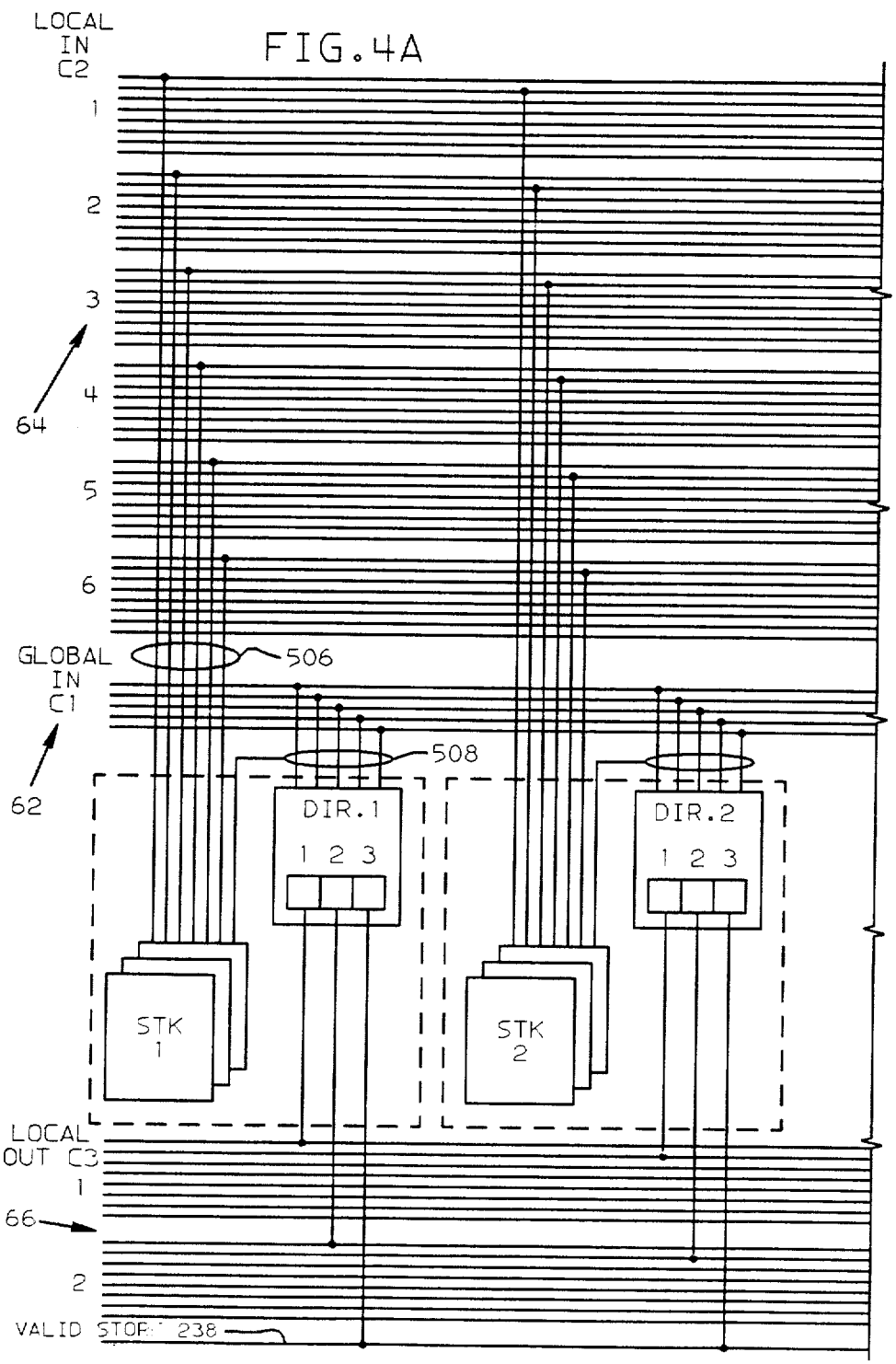

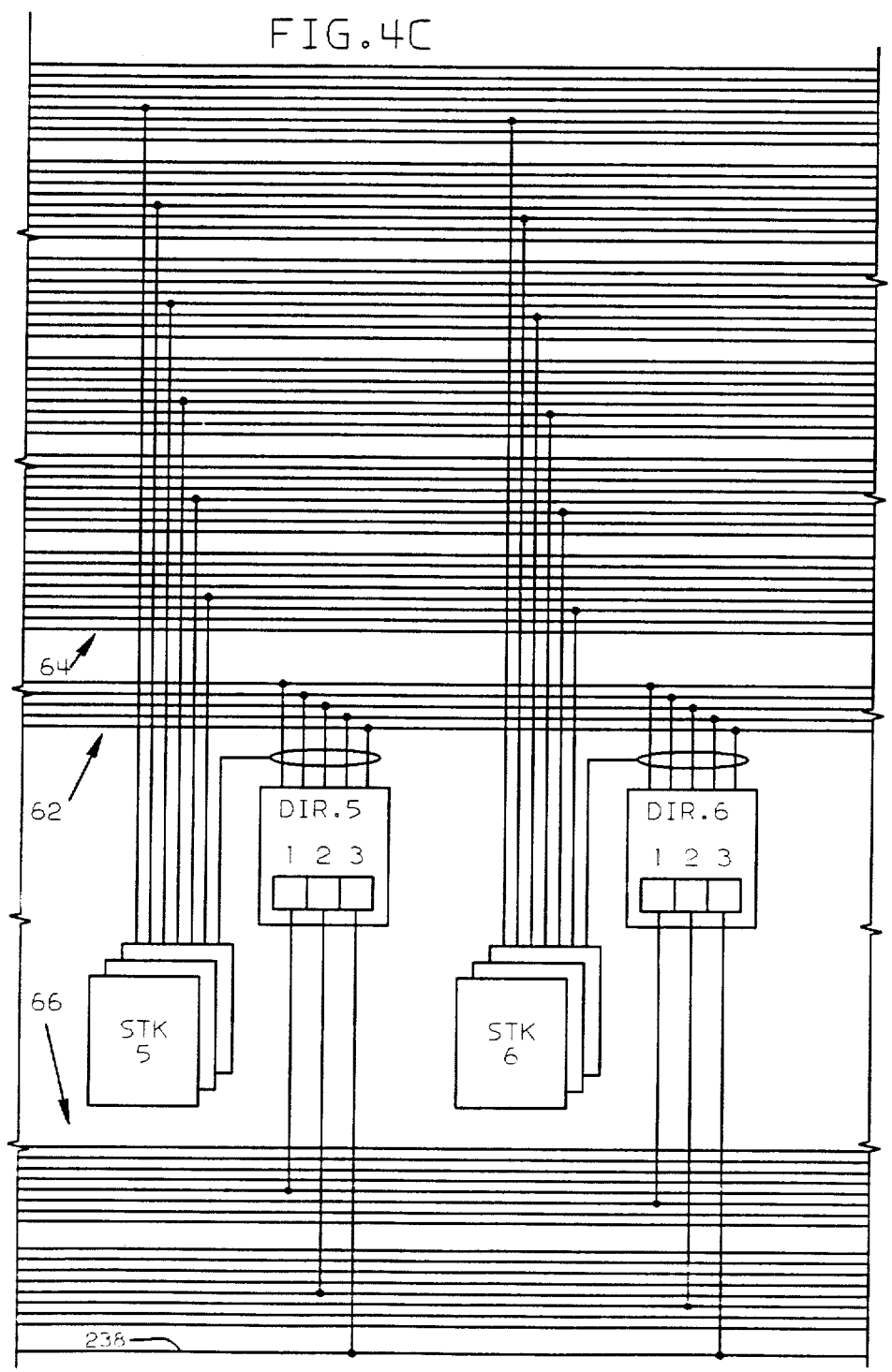

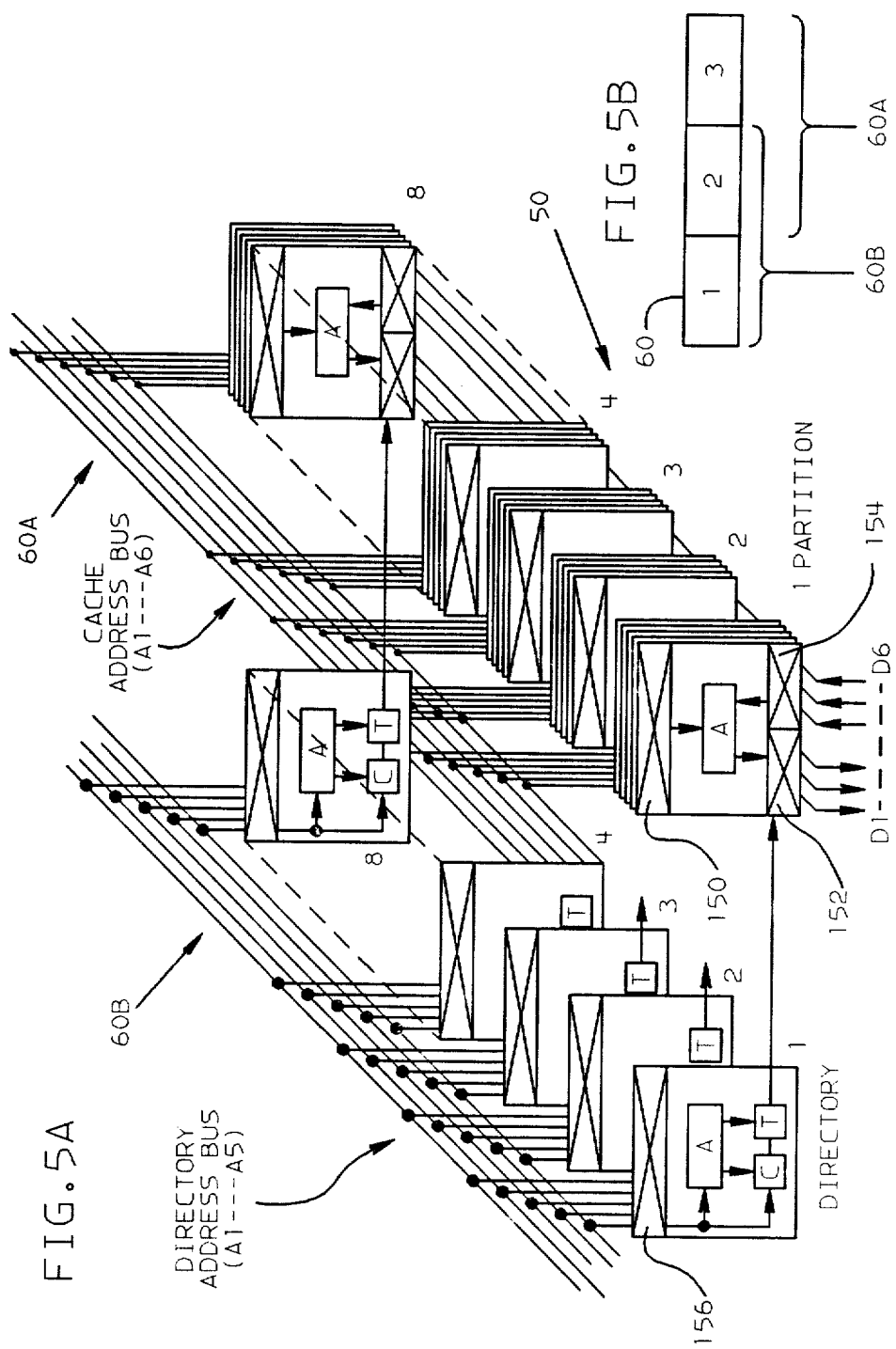

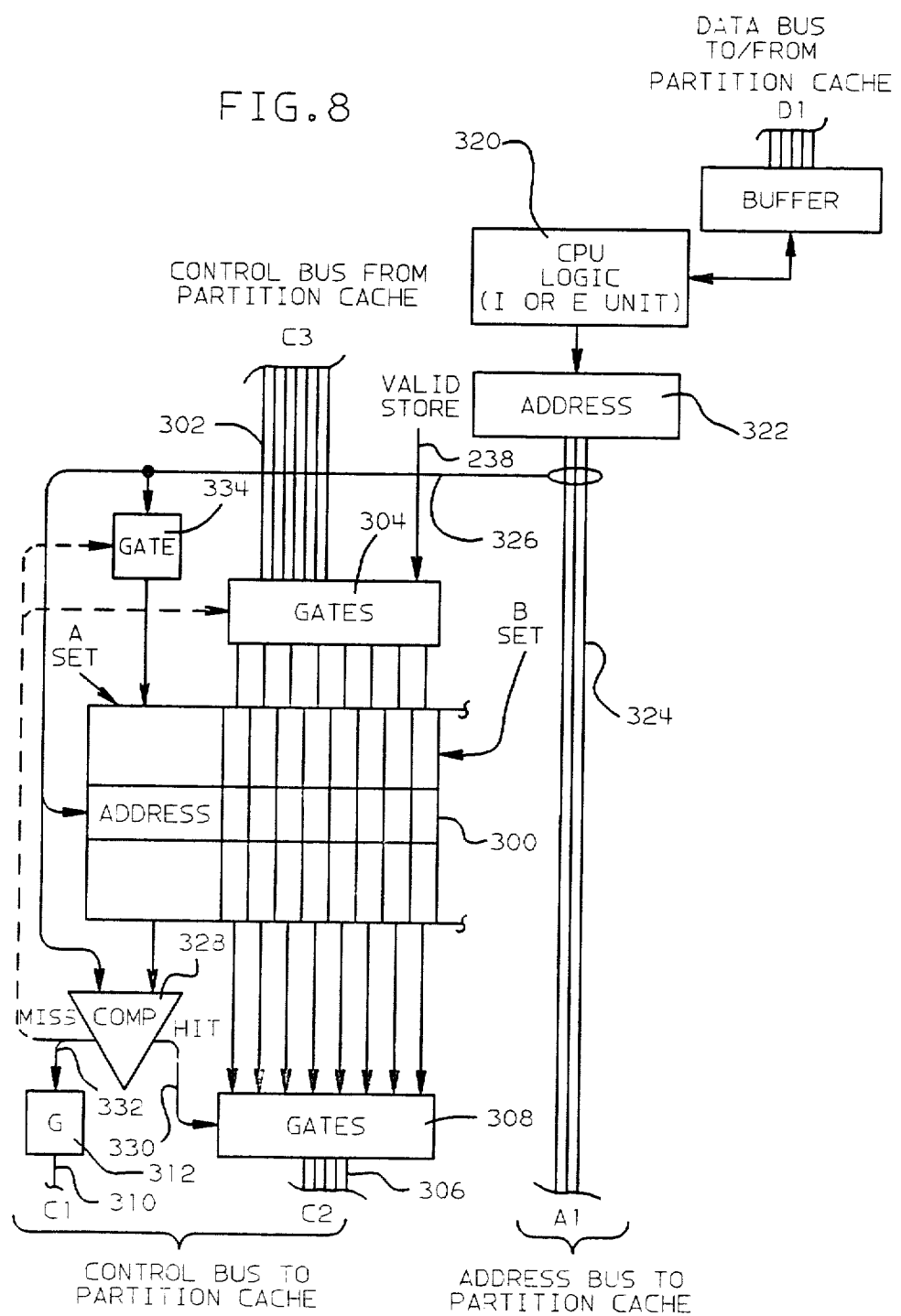

FIG. 9  INSTRUCTION TYPE PLAT ENTRY
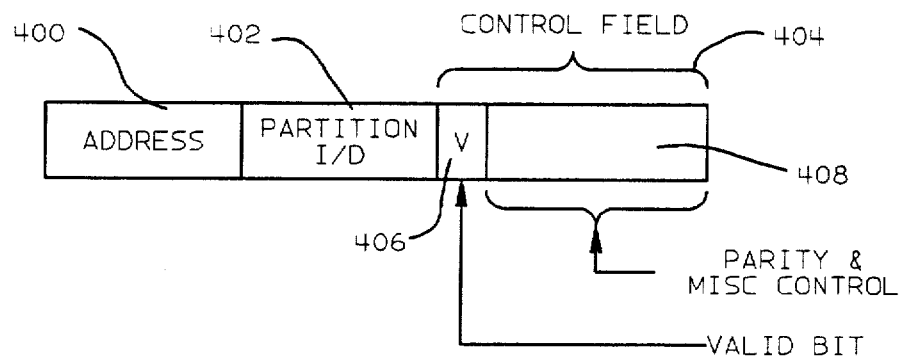
FIG. 10  DATA TYPE PLAT ENTRY
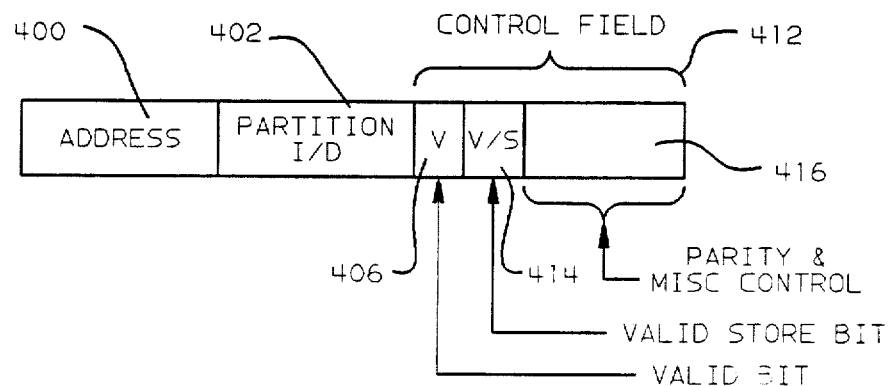

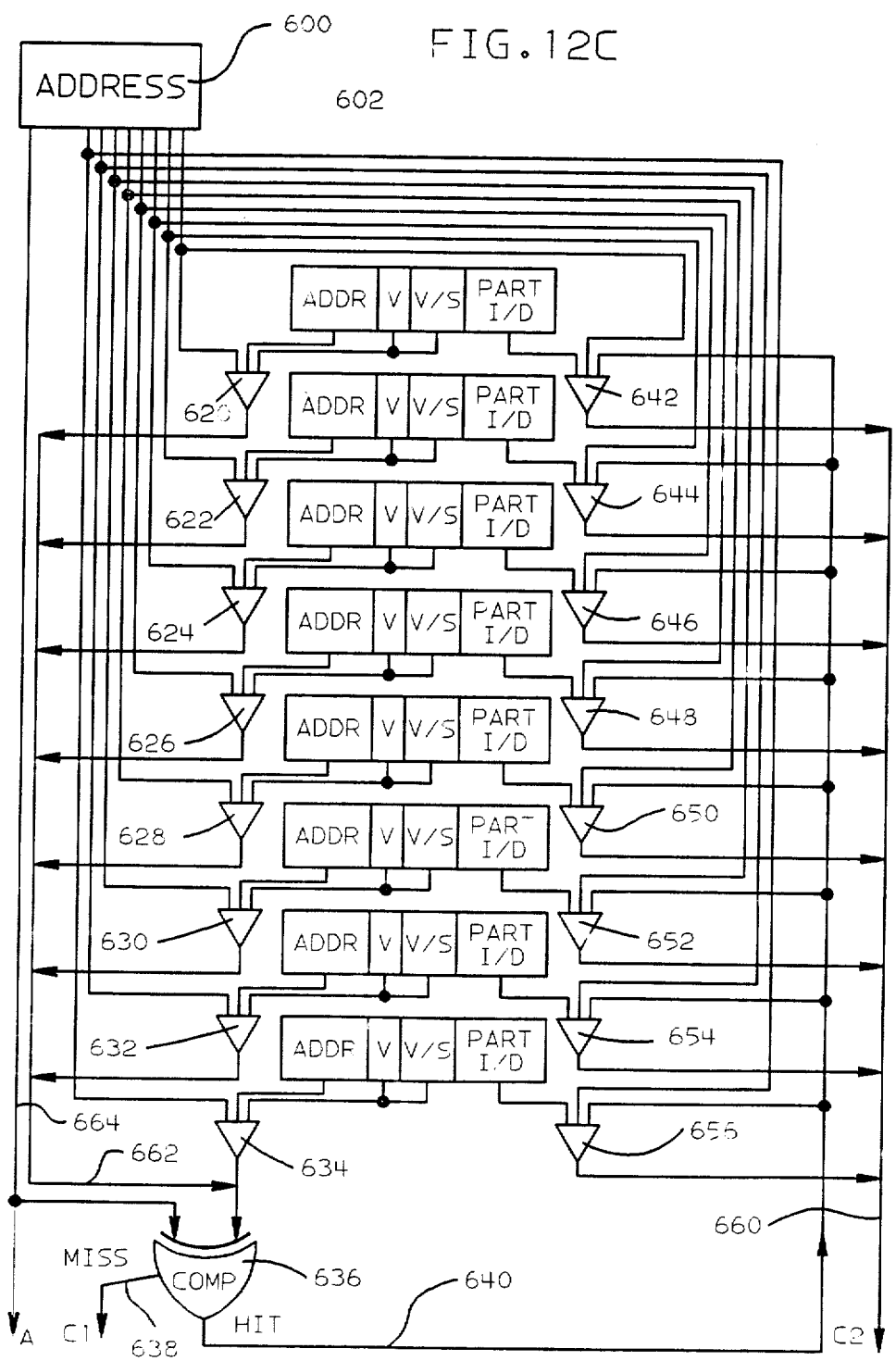

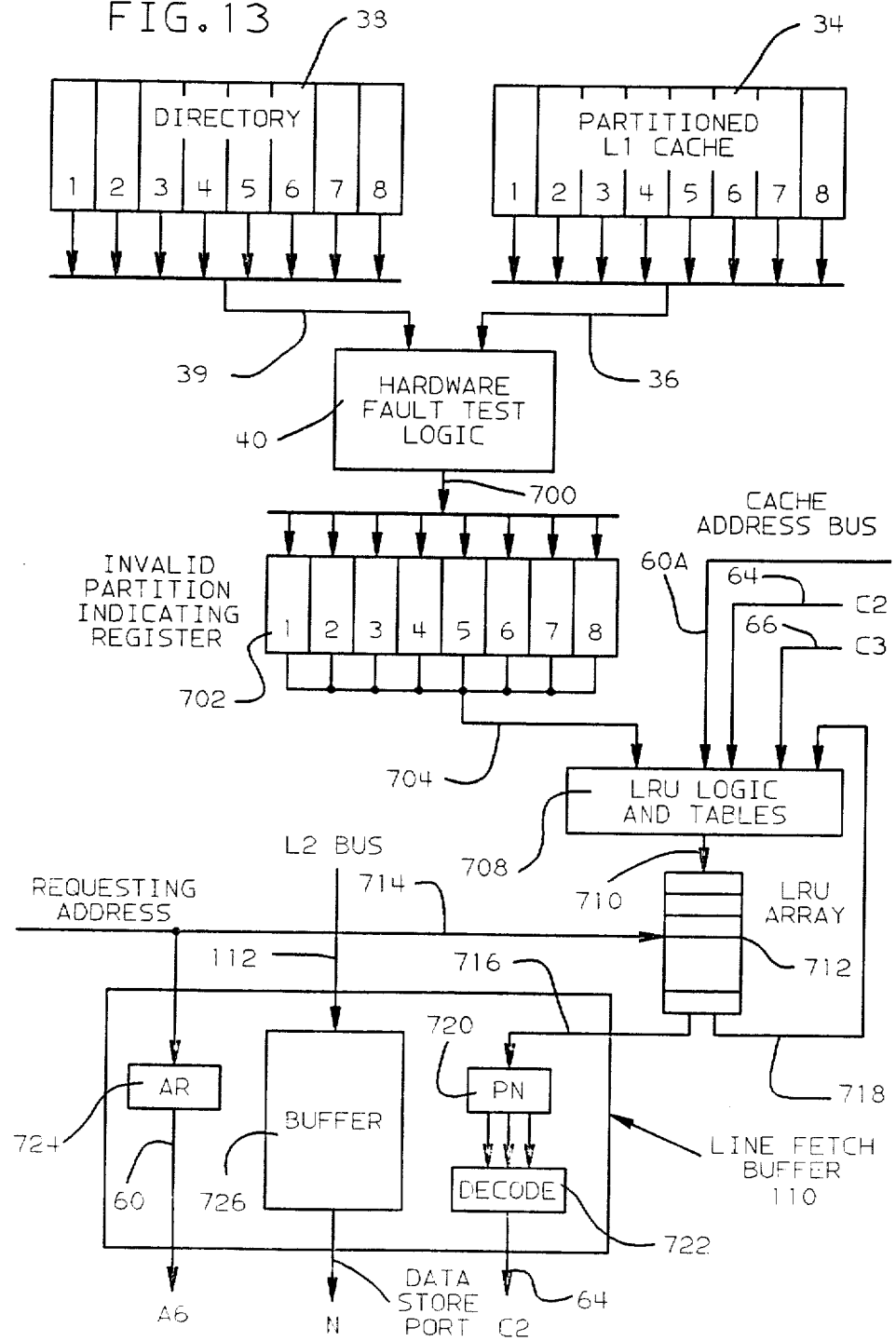

PARTITIONED CACHE MEMORY WITH PARTITION LOOK-ASIDE TABLE (PLAT) FOR EARLY PARTITION ASSIGNMENT IDENTIFICATION

FIELD OF THE INVENTION

This application is a continuation-in-part of copending U.S. application Ser. No. 07,034,136 filed Apr. 3, 1987 by J. G. Brenza having the same title, inventorship and assignee as the subject application, now abandoned. The priority date of application Ser. No. 07/034,136 is claimed for all matter in this application common to application Ser. No. 07/034,136.

The present invention relates to the field of cache memories, in computer systems. Cache memories are of various types depend on function but in general are a temporary storage facility for information with which the computer system is directly working and cache memories may be separate from larger main memory systems. The way that cache memories connect to and work with main memories is significant to computer performance. This invention particularly relates to a cache memory divided into sections or partitions with a partition look-aside table (PLAT) which identifies the cache partition containing information when a cache access is to be made. The partition look-aside table initiates other functions if it cannot identify a location for the requested information to be accessed.

BACKGROUND OF THE INVENTION

One of the most important factors in the performance of a high speed, sophisticated computer is the performance of the associated memory system. It is now generally assumed that such a computer system will include the use of a cache memory to facilitate the handling of program requested information. It is known that the larger the capacity and the faster the speed of operation of a cache memory, the better the overall performance of the computer system.

The prior art shows various efforts to improve the performance of cache memories. These efforts have included the use of multiple cache memories in various organizational relationships. For example, the use of separate cache memories for instructions and for data is known. Other cache designs use two caches in parallel in an odd-even interleave design so that memory access time for information from the cache for a string of data is improved. Other cache designs use different size caches in a hierarchical arrangement. Some of these cache designs are intended for use with more than one processing element or execution unit so that several different cache accesses may be initiated in a short time interval.

One of the difficulties typical of these prior art designs is that when a cache request is made, the cache must perform a search to determine if the information is available. If the cache access is successful, the information is provided to the requesting unit. If the information is not available, a cache miss signal is followed which summons the requested information from another level of memory while the requesting unit either waits or does something else. In most cache designs there is a significant time penalty if a cache miss occurs and the design is optimized so that cache misses are infrequent.

Applicant is aware of the following pertinent patents and publications:

U.S. Pat. No. 4,169,284 entitled "Cache Control For Concurrent Access", assigned to the same assignee as the present invention, shows a cache memory control which provides two cache access timing cycles during each processor storage request cycle. Although this cache allows more than one access per cycle it represents a time interleaved cache and not a true simultaneous access cache.

U.S. Pat. No. 4,371,929 entitled "Multiprocessor System with High Density Memory Set Architecture Including Partitionable Cache Store Interface To Shared Disk Drive Memory", assigned to the same assignee as the present invention, shows a cache memory with storage partitions functioning on a time interleaved basis.

U.S. Pat. No. 4,441,155 entitled "Page Controlled Cache Directory Addressing", assigned to the same assignee as the present invention, shows a cache addressing control system to reduce the cache miss rate.

U.S. Pat. No. 4,442,487 entitled "Three Level Memory Hierarchy Using Write And Share Flags", assigned to the same assignee as the present invention, shows different levels of cache and cache separated into private and shared cache systems. The private and shared cache systems are primarily separate caches with switching mechanisms between them and are not separate portions of the same cache. This design is intended to allow multiprocessor systems to share a memory facility without having the cross-interrogation requirements that would otherwise be necessary.

U.S. Pat. No. 4,463,424 entitled "Method For Dynamically Allocating LRU/MRU Managed Memory Among Concurrent Sequential Processes", assigned to the same assignee as the present invention, is a cache management system for separating a cache memory into partitions of allocated space based on the requirement of the process using the cache memory. The partitions are allocated by a supervisory process and are not physically determined.

U.S. Pat. No. 4,464,712 entitled "Second Level Cache Replacement Method and Apparatus", assigned to the same assignee as the present invention, treats a cache memory system as consisting of separate subsets of pages which are associated with a replacement flag mechanism to control access for replacement of cache contents.

U.S. Pat. No. 4,484,267 entitled "Cache Sharing Control In A Multiprocessor" assigned to the same assignee as the present invention, is a multiprocessing environment where each processor has a private cache. Each cache has a directory containing a sharing flag to control whether the associated cache line operates in a store-through of a store-in mode. This creates two different types of cache operating modes for use in handling both normal cache accesses and the cross-interrogation process with other caches.

There are other patents of interest in this field. U.S. Pat. No. 4,503,501 shows cache memory space partitioned into domains by a supervisory control system. U.S. Pat. No. 4,493,033 shows a dual ported cache operating in a time interleaved manner. U.S. Pat. No. 4,195,342 shows another dual ported interleaved cache arrangement. U.S. Pat. No. 3,618,041 is an early patent showing segregation of instructions and operands into different caches. U.S. Pat. No. 4,502,110 is a split cache having equal size operand and instruction memories.

IBM Technical Disclosure Bulletin, Vol. 22, No. 2, July 1979, pages 851 and 852, entitled "Partitioned Memory And Split SCE For Asymmetric Multiprocessor" shows an electronic fence under supervisory control for separating a memory into two sections and restricting access to one of the two sections.

U.S. Pat. No. 4,797,814 entitled "Variable Address Mode Cache" by J. G. Brenza and having the same inventorship and assignee as the subject application has important background information for the subject application. The contents of U.S. Pat. No. 4,797,814 are incorporated by reference into the subject application.

There is a continuing need for improvements in cache memory design, particularly for cache designs that may be used to handle a large number of requests in a short time interval or essentially simultaneously.

SUMMARY OF THE INVENTION

This invention is an improved cache memory system. This improved cache memory offers particular advantages in an environment having multiple processing elements within a single processor (CPU) but does not require or depend upon such an environment to display its advantages.

In order to reduce the time required to execute an object program, it is desirable to process multiple instructions from that program in parallel, which then invoke multiple execution units in parallel. This practice involves multiple instruction decoders, parallel instruction streams, and "out-of-sequence" executions. Since both the instructions and data operands are usually requested from cache, it is desirable to provide multiple cache ports and multiple, independent cache operations during a single CPU machine cycle.

The cache memory according to the invention is an M sectioned or partitioned cache where M is preferably a power of 2 such as 8. The cache is capable of performing one event per partition per cycle or M events per cycle. The cache has N ports where N is equal to or less than M. N is machine specific but is usually less than M and factorable by 2. The embodiment discussed in this application is a cache with eight partitions and six ports because these seem to be realizable and useful design factors considering the appropriate measures of design complexity and performance improvement. The number of partitions is not limited to 8 and may just as well be 4, 16 or 32. The cache is controlled using a partition look-aside table (PLAT) which identifies the correct partition to access for information when a request is sent to cache.

Each cache partition operates independently and in parallel. Each partition may execute a store or fetch operation on each machine cycle. Address switches, data bus switches and special control systems are provided so that any partition may be connected to any port. Thus, multiple combinations of partition to port connections can be controlled for each cycle so that the cache may execute a combination of N stores and fetches at each cycle. The cache is designed so that the number of partitions is equal to the number of set-associative bins in the design. The cache data placement is such that all data conventionally allocated to a particular bin is also allocated to a corresponding real partition. That is, a cache line is fully contained within a single partition. Thus, a processor with multiple execution units may perform several stores or fetches at the same time when those requests are directed to different cache partitions.

A PLAT (partition look-aside table) controls the cache and stores a set of the more recently accessed cache line requests together with a partition assignment identifier for the line address. Multiple PLAT's can be provided for instruction requests and for operand requests. Using the stored information, the PLAT directs machine produced addresses to the correct cache partition when it is determined that the information resides in cache. A miss in the PLAT does not mean a cache miss as that term is generally understood. If the partition information is not in the PLAT, the cache request is directed to all partitions and the cache directory simultaneously using a global request. If the information is found in cache as a result of a global request, the PLAT is updated with the line address and partition identifier. If the information is not found in cache, a known cache miss operation is used, such as, use of a Directory Look-Aside Table (DLAT) and an access to main memory or a higher level of cache i.e. the storage hierarchy.

The cache miss-control-logic has, in part, an LRU (least recently used) algorithm which determines the location, or for this cache the partition number, in which to load the new line fetched from the higher level storage hierarchy. In this way, new cache lines are rotated to all partitions on a least-recently-used basis.

The embodiment of a partitioned cache shown here is referred to as an L1 cache which is a private processor cache. An L2 or L3 cache is larger and closer to main memory than an L1 cache and may be shared. This L1 cache does not first execute a cast-out of the old line prior to the new line load operation since a store-thru L1 cache is implemented. That is, all store requests are sent to L1 and to at least one higher level of the storage hierarchy. Loading new line data into the cache results in just one of M partitions being busy.

THE DRAWINGS

FIGS. 4A, 4B, 4C and 4D are in left to right order and show a detailed diagram of the control bus structure associated with the partitioned cache memory shown in FIG. 2.

FIG. 5A is a showing of the relationship of the directory and partition structure in a cache memory according to the present invention as shown in FIG. 2.

FIG. 5B shows the organization of one of the address ports comprising the address bus shown in FIG. 5A.

FIG. 8 is a detailed showing of the PLAT structure of the cache memory shown in FIG. 2.

FIG. 9 is a showing of a schematic diagram of the structure of a data field in the instruction type PLAT according to the present invention.

FIG. 10 is a showing of another structure of a data field in the data type PLAT according to the present invention.

FIGS. 12A, 12B and 12C are each a detailed showing of different embodiments of the address structure of a partitioned cache memory according to the present invention.

FIG. 13 is a detailed showing of a fault tolerant structure for identifying and shutting off faulty partitions according to the present invention.

DESCRIPTION OF THE PREFERRED EMBODIMENT

Figure 1:
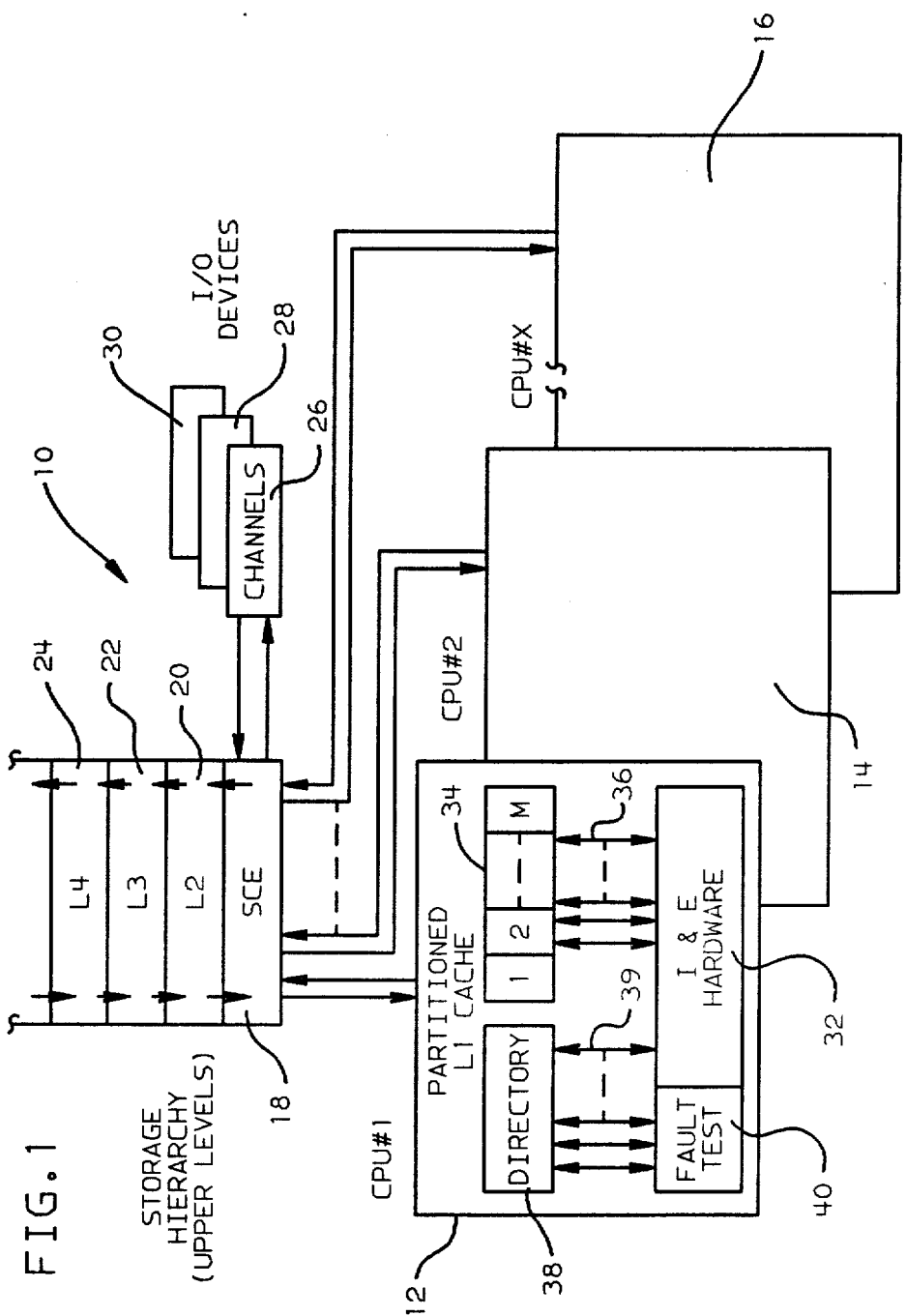
FIG. 1 is a system diagram of a computer system having multiple central processing units (CPUs) incorporating a partitioned cache according to the present invention ensuring a common storage hierarchy.

Referring now to FIG. 1, a computer system 10 is shown which contains multiple central processing units 12, 14 and so forth to unit 16. Each of the central processing units has an input and output connection to a system control element 18. The system control element 18 is connected to a L2 (level 2) memory or storage hierarchy 20 which in turn is connected to successive levels of storage hierarchy L3 which is labeled 22 and L4 which is labeled 24. Each of these levels is progressively larger in capacity and further from the processor. The object is to have instructions and data as close to the central processing units as is possible for the size of memory involved. The use of multiple storage hierarchies in computer systems is known. The showing of these levels is illustrative of design practice and not a particular requirement of the partition cache. The system control element 18 also has various channels 26, 28 and 30 which serve to provide connections to the input-output devices which may be terminals, printers, disk-drives and the like.

Each central processing unit will contain instruction and execution (I and E) hardware labeled generally 32, and hardware fault test logic labeled generally 40. The instruction and execution hardware 32 allows each central processing unit to perform conventional kinds of computer operations. Associated with the central processing unit is a L1 (level 1) cache memory system which will be a partitioned cache memory 34 according to the present invention. Such a cache 34 contains M partitions of memory and is connected by data paths 36 to the instruction and execution hardware unit 32. Up to N data paths 36 may be used depending on the optimum data flow requirements intended for the instruction and execution unit.

A directory 38 is provided to facilitate finding information in a storage hierarchy which is called for by the instruction and execution hardware 32. Directory 38 is connected by control paths and data paths 39 to the instruction and execution hardware 32.

The hardware fault test logic 40 monitors the address, data and control paths to and from the I to E hardware, directory and cache. Should a failure occur in any of these paths, a fault latch associated with a particular failure may be set for diagnostic, recovery, or otherwise corrective actions.

The other central processing units connected to the same system control element 18 will have similar internal structures providing for instruction and execution, a local partitioned cache memory, and an appropriate directory to access the contents of the storage hierarchy.

Figure 2:
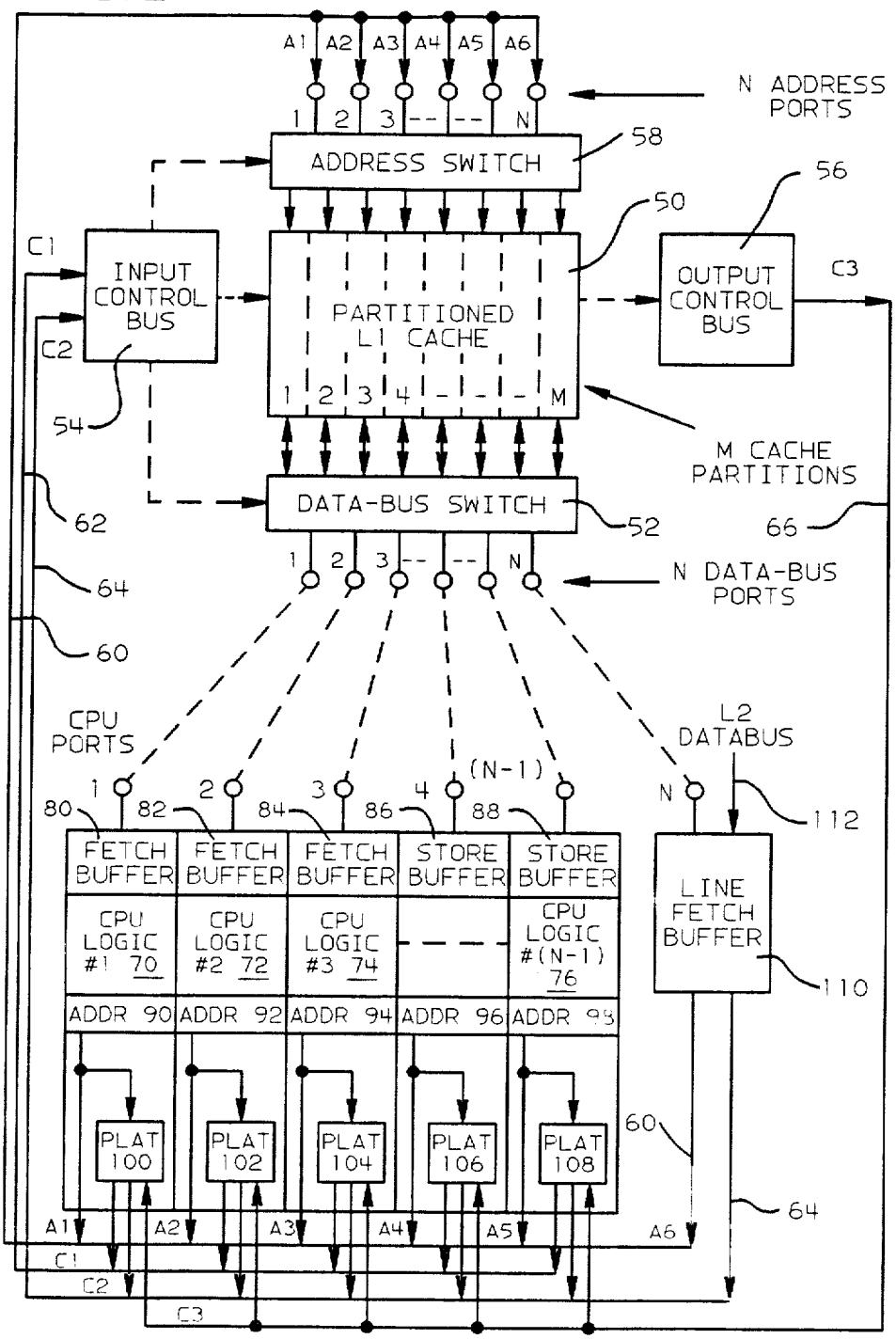
FIG. 2 is a schematic diagram of an embodiment of a partitioned cache memory according to the present invention.

Referring now to FIG. 2, the structure of a partitioned cache and PLAT according to the present invention is shown. A cache memory having M cache partitions 50 is shown. In this case, for convenience, eight cache partitions are shown in this particular embodiment. This appears to be an appropriate number for many purposes to provide a manageable level of control as well as providing the advantages that may be obtained in a partitioned cache memory.

The various cache partitions 50 are connected by a data bus switch mechanism 52 to N data bus ports. In this case, six data bus ports are used because it appears to be an appropriate number to work effectively with a cache memory having eight partitions and for the requirements of the hypothetical processor with which this system will be used.

The data bus switch 52 is under the control of an input control bus unit 54 which provides appropriate switching control signals for the data bus ports. The cache also has an output control bus unit 56 which controls the output data bus structure. The input control bus unit 54 is connected to an input address switch 58 which assigns required addresses to the appropriate partitions under the control of an address request bus 60. The input control bus unit 54 is also connected to the data-bus switch 52 which assigns the data-bus ports to the addressed partition.

Input control bus unit 54 is connected with two control busses 62 and 64. Control bus 62 is the C1 bus which handles global requests of the cache unit. A global request of the cache unit is one which is directed to all partitions of the cache simultaneously. This will be explained in greater detail later. Control bus 64 is the C2 bus which handles local requests of the cache unit which are directed to a specific selected partition. These local requests of the cache unit will be explained in greater detail later.

Output control bus unit 56 is connected to the C3 buss 66 which handles local output control signals from the cache. The significance of the local output requests will be explained later but it may be observed that since any contents of the cache reside in a specific partition, only specific partitions will be producing output requests and therefore all output requests are local and cannot be global.

Each central processor unit (CPU) will have various arithmetic and logic units associated with it. In FIG. 2, a central processor unit having various elements 70, 72, 74 and 76 is shown. These units may be of any type desired and they consist of various combinations of arithmetic, logic or instruction processing elements. Each of the data busses from the data bus switch 52 is connected to this group of central processor units through a combination of fetch buffers and store buffers to provide the plurality of input and output data paths to the central processing units. Thus, in a case where six data busses are proposed, three of the data busses may be connected with fetch buffers 80, 82 and 84 while two of the busses are connected to store buffers 86 and 88. All of these buffers are connected to the central processing unit and its various elements.

The central processor generates requests for the memory hierarchy to a plurality of address generating mechanisms 90, 92, 94, 96 and 98. The address generating units are connected to an associated PLAT so that the central processor has a plurality of PLAT units 100, 102, 104, 106 and 108. Addresses generated are placed on an address bus for each address generating mechanism on the address request bus 60 as well as to the associated PLAT. Each PLAT when it receives an input address may generate a global request of the partitioned cache on the C1 bus or a local request of the partitioned cache on using a selected one of the C2 busses.

The PLAT's each have an input bus from the output control bus unit 56 containing local input control signals. In general, when a central processor logic unit, such as logic unit 70 makes a request of memory, the address generating unit such as 90, produces an address request on the address request bus 60. This request goes both to address switch 58 and to the PLAT 100. If the PLAT can identify the partition of the cache in which the requested information is located, a request on the local request bus 64 is generated to the input control bus unit 54. This causes the address switch 58 to direct the requested address only to the particular partition in the cache containing the requested information. The databus switch out 52 is then switched to provide the requested information from the particular partition in which it is located to the particular requesting unit for which the information was obtained. In the case where the PLAT cannot identify a particular partition, the global request bus 62 is activated and the address switch provides the address to all partitions of the cache memory.

A line fetch buffer logic 110 is provided so that if requested information is not in the cache 50, a request may be passed to the next level of memory in the hierarchy for the requested information. The line fetch buffer therefore is connected to one of the data bus ports of the cache, and in this example, is shown as being connected to the Nth or last port. The line fetch logic is also connected to the CPU request address bus 60 and to a local request bus 64. The data bus from the next level of storage hierarchy is shown schematically at 112. It is important to note that the line fetch buffer 110 only requires access to a single selected cache partition when storing the contents of the line fetch buffer into cache. The other cache partitions may operate normally when the line fetch buffer is storing into cache. See FIG. 13 also.

Generally, the operation of the system shown in FIG. 2 may be described in the following fashion.

The cache is divided into a plurality of sections or partitions and each partition can operate independently and in parallel with the others. Each partition may execute a store or a fetch operation on each machine cycle. Address switches 58, data bus switches 52, and the appropriate control systems are provided so that any partition may be connected to any input or output port. Thus, multiple combinations of partition and port connections may be activated during a single cycle of memory operation. This permits the cache to execute a combination of stores and fetches in a single machine cycle equal to or less than the number of ports.

The number of partitions is equal to the number of set-associative bins chosen for the cache design. The cache data placement is such that all data conventionally allocated to a particular bin is now allocated to occur corresponding to a physical partition.

The partition look-aside table (PLAT) is incorporated into the processor design. The exact logical and physical placement of the PLAT is as to the designer and may depend on machine organization. One appropriate location for one or more PLAT's is close to the address generating hardware in the processor. Multiple PLAT's can be used for handling a typical central processor organization. For example, one type of PLAT may be ideally designed for handling instruction requests and another type may be used for data operand requests. Multiple copies of either type may be used, individually, by the CPU logic units.

The PLAT's will store a set of most recently accessed L1 line addresses together with a partition identifier for each such line address. The PLAT's will then direct machine generated addresses to the correct L1 cache partition in a high percentage of the L1 cache access requests. Such requests are called local requests and use the local control line bus 64. A PLAT miss will require that the generated address be directed to all partitions simultaneously to determine the partition allocated to the corresponding L1 line. In this case, the global control line bus 62 will be used. At this time a new entry is made in the PLAT's storing the line address and partition identifier, subsequent store or fetch requests to the same L1 line will be directed to the correct partition until the entry is aged from the PLAT.

Ideally the best performance from a partitioned cache memory according to the present invention would result with the number of ports equal to the number of partitions, and if each port was connected with a partition on every excess cycle. However, physical constraints such as the number of input and output connections per memory array chip may limit the maximum number of ports.

There is a direct correspondence between address ports and data ports. That is, address port 1 is connected to address switch 58 which is provided for data port 1 which in turn is connected to data bus switch 52 and so forth. These port pairs are fixed in the hardware. Furthermore, each data port is either a fetch port or a store port when uni-directional bus drivers are used. With duplex drivers and data switches at the CPU ports, each port may serve as both a fetch and a store port. However, for purposes of this description, the ports are described as one directional ports either as fetch ports or store ports.

As stated before, the address switch may function in either the global request mode or the local request mode. A global request causes one of the addresses presented to the address switch to be presented to all the partitions of the cache simultaneously. Thus, the address is switched simultaneously to all directory elements and all cache memory partitions. This is based on control of the global control bus 62. The global control cycle executes as with a conventional cache in the sense that, if the data is valid in the cache, one of the eight directory elements will compare positive and raise a selected gate to the corresponding cache partition. This output is then switched to the requesting data port bus. One global request may be executed in a single machine cycle.

A local request causes an address to be switched to the selected one of the M cache partitions and the directory is not used for the handling of the local requests. During a single machine cycle as many local request addresses may be switched to the cache partitions as there are ports to the cache memory. This is dependent upon each of the local request addresses being to a different partition so that each of the partitions which are addressed may be uniquely connected to a single port. Multiple requests to the same partition on consecutive machine cycles are allowed. The input control busses 62 and 64 determine for each individual address port whether the requesting address is a global request or local request and which port is accessed. If the request is a local request, the control bus 64 codes the partition identifier for the target cache line.

The data bus switch 52 is used to switch the outputs from the partitioned cache arrays 50 to the data bus ports for fetch requests, and to switch inputs from the data bus ports to the partitioned cache arrays for store requests. Whenever the requesting address is a global request, indicating a PLAT miss, and the data is actually found in the cache, in addition to returning the requested data to the CPU, the partition identifier is also returned to the CPU on the control bus 66 so that the PLAT adds that information to its array. A new entry is created in the PLAT storing both the target cache line address and the partition identifier. Subsequent references to that cache line will result in PLAT hits and local requests.

In this example the cache has N direct access ports where N is fixed at the number 6 and the central processor unit is assigned N-1 direct access ports to the cache. Thus, the processor has one less port accessing the cache than the cache has ports. In this case, the processor is assigned five direct access ports to the cache. The last port is reserved for put-away operations of the line fetch buffer 110. For the case of a unidirectional buffer, each port is either a fetch port or a store port. In this example, ports 1, 2 and 3 are assigned to fetch buffers 80, 82 and 84 and ports 4, 5 and 6 are assigned as store ports to store buffer 86, store buffer 88 and the line fetch buffer 110. Each port is terminated at the CPU with fetch or store buffers.

The individual subdivisions of the CPU are symbolic and are intended to portray the CPU design in which many operations are executing in parallel and therefore require multiple accesses per cycle to the cache to reduce the average cycles per instruction. One or more of the subdivisions may be thought to be an instruction processor, a fixed point arithmetic unit, a floating point arithmetic unit, a vector processor, and so forth to illustrate various possible computer functions. The best allocation of cache ports to a CPU function, is based on CPU design optimization, including the optimum mix of store and fetch ports to total the number of provided ports to the cache.

Each central processor subdivision such as 70, 72, 74 and 76, in its processor function have the hardware capability to generate an address when cache data is needed for instruction fetches, operand fetches, or operand stores. This is indicated by the provision of address generating units 90, 92, 94, 96 and 98. The address generation may result from incrementing a counter, reading an address from an array stack, taking the result from an address generating adder and so forth. After the address is provided, the address is placed on the address request bus 60 where it is provided to the local PLAT, such as PLAT 100, 102, 104, 106 and 108 as well as to the address switch 58 and to the line fetch buffer 110. The line address is tested in the local PLAT. If a PLAT miss occurs, the PLAT places a bit on the global control bus 62 to indicate a global request for that PLAT. If a PLAT hit occurs, a bit is placed on one of the positions of the local request control bus 64 to indicate the partition to which that address should be directed. The placing of this bit on the position of the local control bus indicates both the presence of the local request and identifies the partition for the requested data in the cache.

Although, the system in FIG. 2 provides one PLAT for each CPU logic unit, a variety of PLAT arrangements are possible, depending on the design requirements. It may be desirable to have different types of PLAT's for different types of functions. Each type may then be replicated at each CPU logic unit which performs that function. For example, one type is ideally provided for data operand fetches and stores. Each type may then have multiple copies strategically located in the CPU logic partitions. Each PLAT is a small register array with, for example, (1-4) comparators, and duplication of hardware is not difficult due to the comparatively small amount of hardware required for each PLAT. Multiple comparators may be provided since a "set-associative" arrangement of the PLAT arrays improve their performance.

Figure 3:
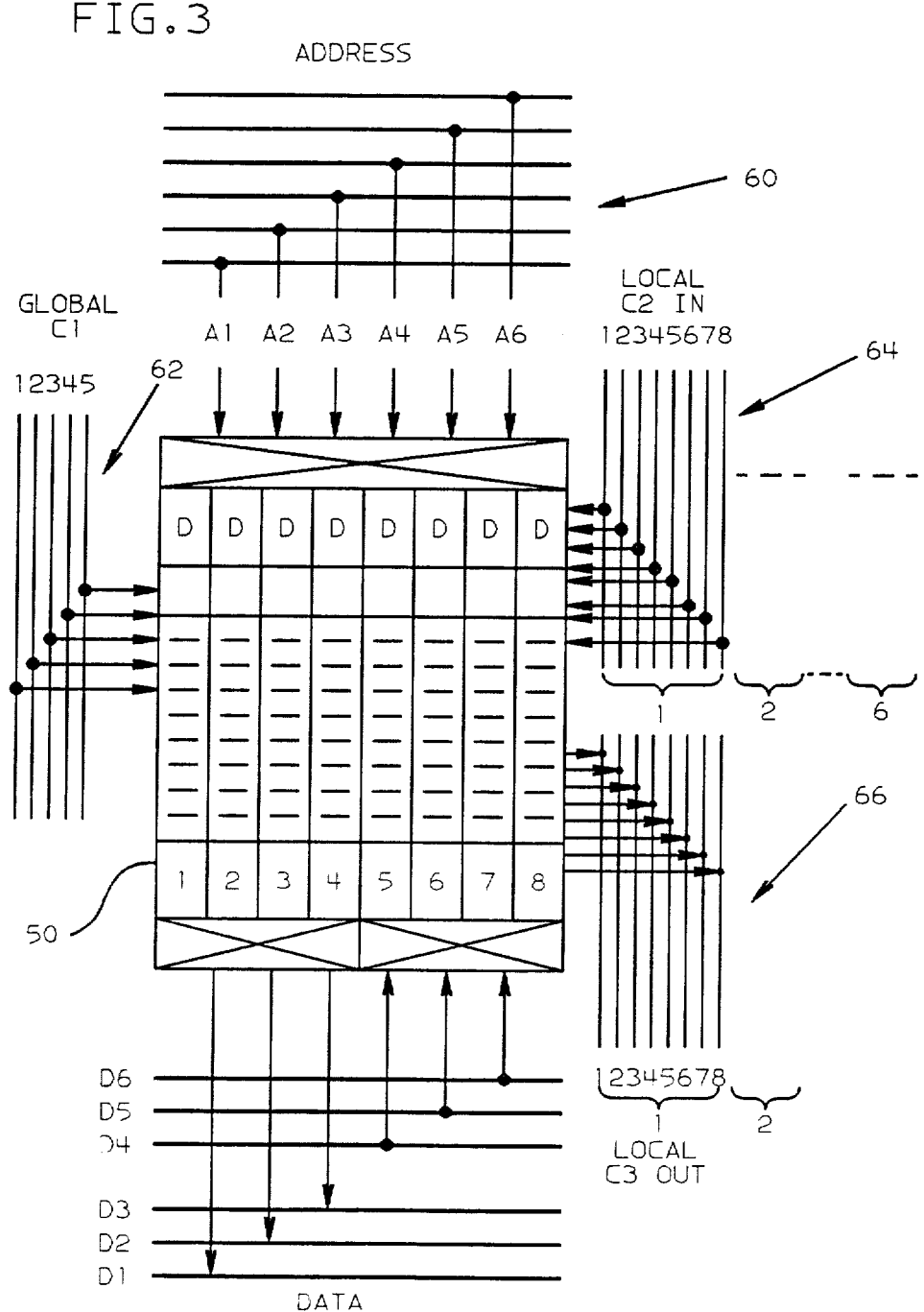
FIG. 3 is a more detailed showing of the cache arrays, directory, address, data, and control busses of the partitioned cache shown in FIG. 2.

FIG. 3 shows the embodiment of the partitioned cache 50 of FIG. 2 in greater detail. Shown are the input address bus 60, global control bus 62, and local control busses 64 and 66.

The global bus 62 services PLAT ports 1 through 5 of the CPU. Each bit of the global control bus indicates one of the requesting units of the CPU. The line fetch buffer logic 110 does not require a global request line position of bus 62 since line buffer cache store operations are always local to a known cache partition.

A set of local-in-control busses 64, 1 through 6, are provided for the six cache ports. In this case, a local-in-control bus is provided for each PLAT CPU port and for the line fetch buffer logic port. A set of two local-out-control busses 66 are shown in FIG. 3. The control bus 66 returns a partition identifier determined by a global directory search, to be stored in the PLAT of the port which initiated the global request. Although it is not necessary, two local-out-control busses 66 are shown to be used for instruction type and data type requesting PLAT's.

The sixth port N is shown in FIG. 2, and is used for line put away and does not use a local C3 output control bus because it receives its partition identifier for store requests from the least recently used (LRU) control system, shown in more detail in FIG. 13. The output control bus C3 also includes a valid store line to be described later. Also indicated in the figure is the internal structure of the partitioned cache. Each partition includes an address switch, a partition directory, the actual cache memory array and data bus switches.

Figure 4B:
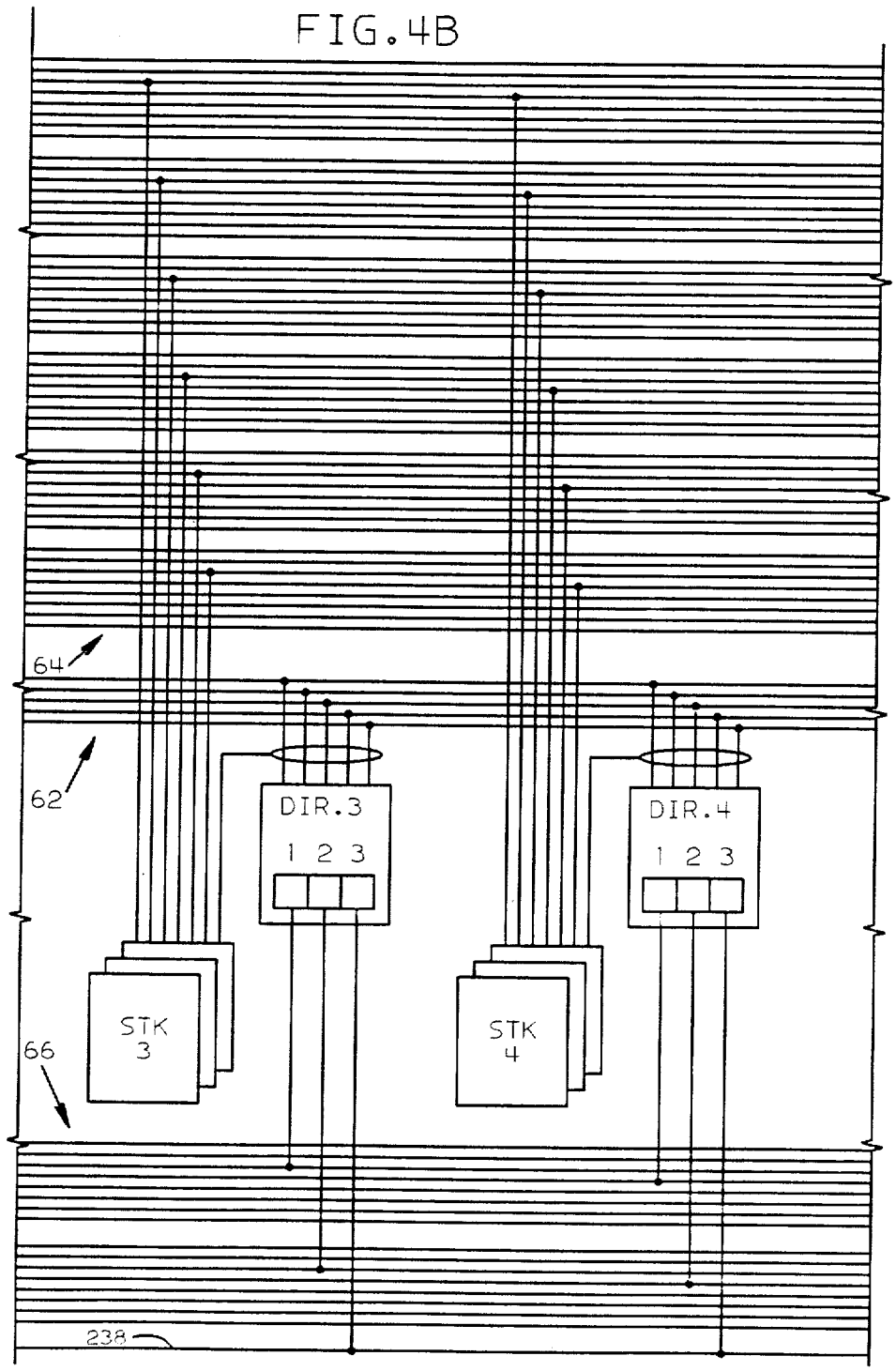
Figure 4D:
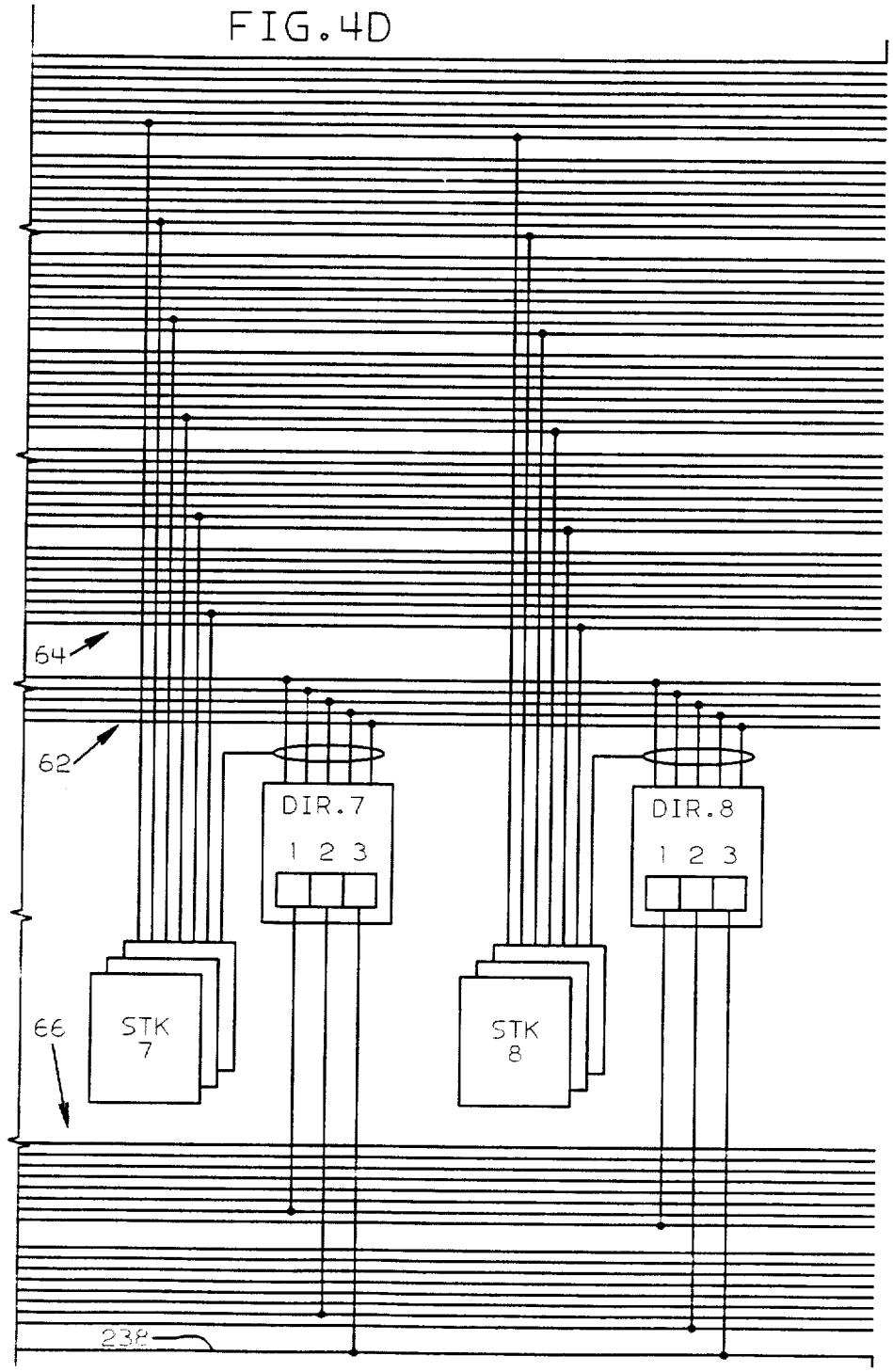

FIGS. 4A, 4B, 4C and 4D show the eight cache partitions of the cache, memory 50. Partitions 1 and 2 are shown in FIG. 4A in which partition 1 is comprised of directory (DIR.1) and partition data memory (STK1). Likewise, each of the other partitions is shown in DIR and STK, and all are shown connected to the control bus structure. The address and data busses are not shown in this figure but are shown in greater detail in other figures. All the lines of the global control bus in 62 are directed to all eight of the partition directories DIR.1 through DIR.8. The local control bus C2 is broken into six groups of control lines, each group having one line to each partition data memory (STK). Thus, each PLAT has one group of lines of the local bus in 64 and are each directed to a target partition memory stack of the memory array.

The lines of the local control bus out 66 are derived from a global-hit register in each partition directory for transmitting the cache partition identifier to the PLAT's upon a cache miss for a global request. The global-hit register has three bits which have the following functions: Bit 1 is a partition identifier to indicate an instruction type PLAT; Bit 2 is a partition identifier to indicate a data type PLAT and Bit 3 is a valid store indicator line. The registers for the partition directories may have other compositions and functions as necessary in the memory structure. The output for each bit in these registers has a unique line so that the particular cache partition directory originating a signal can be identified. The local output busses thus receive the partition identifier bit resulting from a global request and the valid store (V/S) line if the store interrogate state exists for the particular directory entry having a global request hit. Note that the store interrogation operation and valid store line generation is performed for global fetch as well as global store requests. The store interrogate operation involves testing various control bits in the directory such as the valid bit, exclusive bit, storage key bits, etc., as required by the system architecture for defining a useable cache access.

Referring now to FIG. 5, the cache data address bus 60A is connected to each of the eight partitions of the cache 50 according to the present invention, in which one illustrated line represents all bits in a cache address. In this embodiment, the output data busses D1, D2 and D3 as well as the input data busses D4, D5 and D6 are connected to fetch or store data from or into any partition. Although busses D1–D6 are unidirectional, it is understood that any or all can as well be bidirectional data busses. Each partition has a partition directory which may, for example, be on a stand-alone associative array chip. Each partition directory and partition data memory has address decode circuits, whereas just the cache partition data memories have data bus switches. The various address decode circuits 156 for the various partitions are shown schematically.

For example, partition 1 of cache 50 has address decoder switch 150 connected to the address bus 60A. Data bus switches 152 and 154 are also associated with the first partition. The directory 1 associated with the first partition has address decoder switch 156 connected to the directory address bus 60B. The other cache partition directories and data memories are similarly organized. Note that the address bus 60 of FIGS. 2 and 3 is composed of three fields 1, 2 and 3 used by address bus 60A and 60B of FIG. 5B. Each partition directory 38 requires the mid and high-order fields 2 and 1 in bus 60B; whereas each partition data memory requires the mid and low-order fields 2 and 3 in bus 60A.

Figure 7:
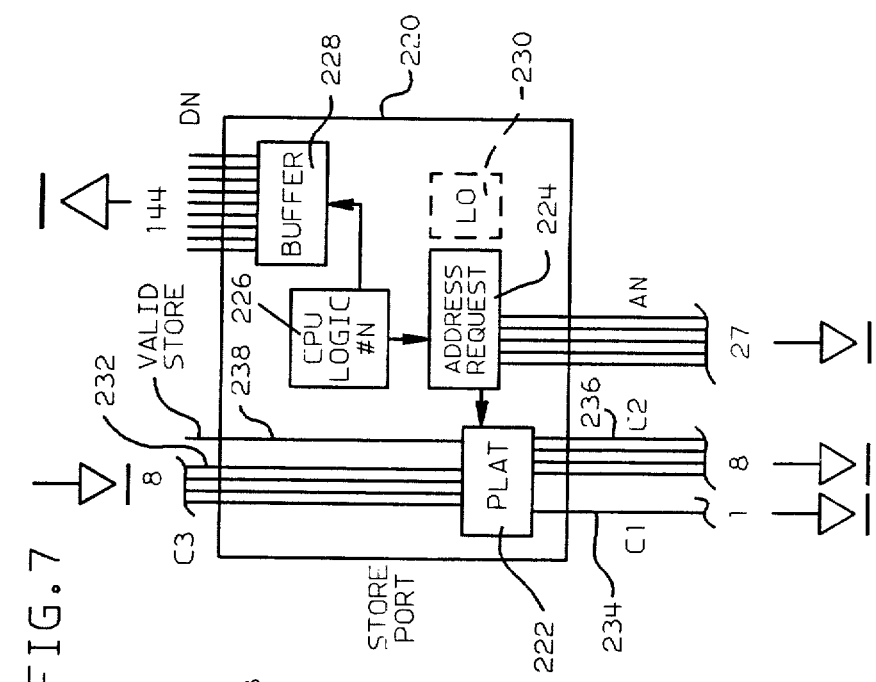
FIG. 7 is a detailed showing of an embodiment of a CPU store port according to the cache memory of FIG. 2.
Figure 6:
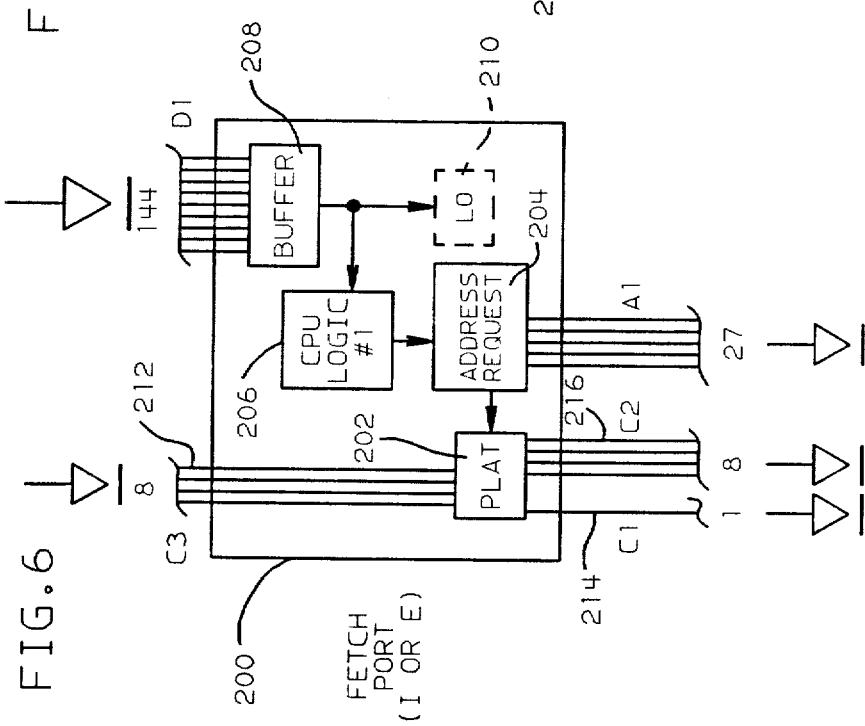
FIG. 6 is a detailed showing of one of the fetch ports of a cache memory according to the embodiment shown in FIG. 2.

Referring now to FIGS. 6 and 7, two different embodiments of CPU ports are illustrated for use with the present invention. In FIG. 6, a CPU port 200 is shown which may be used as a fetch port for either instructions or for data operands to be executed. The port contains a PLAT 202, an address request logic unit 204, CPU instruction handling or arithmetic logic unit 206, an input data buffer 208, and it may contain a local store 210. The PLAT is connected to C3 global partition identifier lines 212, C1 global request lines 214 and C2 local request lines 216 respectively indicating the partition identifiers for PLAT hits (shown together with the number of bits required for the operation in each case). The address request generation unit 204 produces 27 bit addresses (represented in FIG. 5B), and the buffer unit 208 is designed to receive a 144 bit quadword at a time.

In FIG. 7, the CPU port 220 is configured for CPU write memory requests. It has a PLAT 222, an address request logic unit 224, a CPU logic unit 226, a data buffer 228, and a local store 230. Again, the PLAT has C3 global partition identifier lines 232, a C1 global request control line 234 and C2 local request control lines 236 that respectively indicate the cache partition identifier for each PLAT hit. In addition, the PLAT has a valid store (V/S) line 238. The valid store line 238 is input to PLAT 222 from a global-hit entry in the cache, so that when the PLAT creates a new entry, its valid-store bit can be set by the V/S state on line 238. Buffer 228 is designed to handle quadwords of 144 bits.

Referring now to FIG. 8, the operation of a PLAT 300 is illustrated. The C3 global identifier bus 302 connects to switching gate system 304, while the C2 local request bus 306 is connected to switching gate system 308, and the C1 global request bus 310 is connected to a gate 312. CPU logic 320 has an address generation mechanism 322 which provides an IBM S/370XA logical address with a STO on CPU memory request bus 324 to the partitioned cache and also to the PLAT 300 on bus 326. The CPU requested address is provided to a comparator 328, which determines either a PLAT hit on line 330 to gate unit 308 or a PLAT miss on line 332 to gate unit 312. A PLAT hit occurs if any PLAT entry has its address, STO and control fields all compare-equal to those parts of the CPU request and a C2 local request signal on one of local request lines 306 is generated to indicate which partition in the cache is found by the PLAT operation. If no PLAT entry compares equal, a PLAT miss occurs which is signalled on the global request C1 line 310.

In the normal course of operation, the CPU 320 will invoke its address generation hardware 322 placing the requesting address on the output address bus 324. In this embodiment, the requesting address is the well-known logical address with a STO (Segment Table Origin) for designating the address space containing a virtual address. At the same time the address is sent to the PLAT 300 where one or more addresses of that congruence class are read from the PLAT array. The remaining high order bits of the address are compared for each PLAT set associative entry to determine if a PLAT hit is obtained by any of the PLAT entries.

If the program operation of the CPU has multiple address spaces simultaneously active, a STO field is provided in each PLAT entry as well as the other fields, to determine PLAT hits and PLAT misses for received CPU memory requests. In this case, the PLAT compare operation compares both the address and STO fields in each accessed PLAT entry to the corresponding address and STO fields in each received CPU memory request. If all of the compared fields are equal for any PLAT entry in the utilized PLAT table, a PLAT hit is determined and the PLAT generates and sends a local request to the cache. If no PLAT entry in the PLAT table provides a PLAT hit, a PLAT miss is determined, and a global request is generated by the PLAT and sent to the cache.

The STO is loaded into the PLAT entry at the time that each new PLAT entry is created as a result of a global request caused by a PLAT miss. The STO field for a PLAT entry being created is obtained from the CPU memory request causing the PLAT miss.

A PLAT hit will cause one of eight bits stored in a partition identifier array field of the PLAT to be outgated to a corresponding one of eight lines of the C2 local request bus 306. This activated line transmits a local request to its designated cache partition.

A PLAT miss will raise the single bit C1 global request line of bus 310. A PLAT miss will also gate the CPU requested address to all partition directories in the cache. If a cache entry hit is found in any partition, its partition identifier is returned on the C3 control bus 302 by activating one of its eight lines. A new entry is created in the PLAT in response to a global request. This new store entry in the PLAT is invoked by a create entry gate 334 when it gets a miss indication from line 332, which gates fields of the CPU request received from 326 into a PLAT entry in PLAT 300 selected by PLAT replacement logic, which may be identical to the well known cache replacement logic using the least-recently-used (LRU) algorithm.

The PLAT array 300 may be a set-associative array commonly used in cache directories. Multiple entries in Set A, Set B, etc., are examined in parallel for any congruence address. Each set of the PLAT has an individual set of logic, e.g. output gates 308, address and STO compare 328, global gate 312, input gates 304 and 334. The outputs of gates 308 are "OR'ed together" since just any one congruence address may hit on a PLAT cycle. In a similar manner, the outputs 310 from each set are combined to form a single C1 request line. In this case, no hit outputs from all compared PLAT sets are AND'ed together since a miss occurs when there is no hit by any set-associative comparator for a global request C1 to be initiated on bus 310. On the input side of the PLAT, the address bus 326 and C1 control bus 302 may be gated to any one of the set-associative compartments, to Set A or to Set B, etc., as determined by the PLAT entry replacement logic which selects each new PLAT entry to be created.

FIG. 9 shows certain fields in one type of PLAT entry which might be used for a PLAT design to deal only with CPU memory read requests as may be used with read-only data and read-only instructions. An address field 400 contains addresses and a STO field 400A contains a STO value while a partition identifier 402 shows the partition of the cache containing that address. A control field 404 is provided which contains a valid bit field 406 and a miscellaneous field 408 for parity and other control functions.

The STO field may be set to zero, or entirely eliminated from all PLAT entries in any system not using virtual addressing, or not using more than one virtual address space for the execution of any program. In the latter case, the contents of the PLAT need to be invalidated before each next program begins execution on the CPU.

FIG. 10 shows another type of PLAT entry used for CPU memory read and write requests. It may have the same STO field 400A, address field 400, partition identifier field 402 and the miscellaneous fields 416. However, the control field 412 is different by including a valid store bit position 414 and the valid bit position 406.

For this invention to be used with logical partitioning as disclosed in U.S. Pat. No. 4,843,541 by G. H. Bean et al, entitled "Logical Partitioning Of A Data Processing System" by adding a zone identifier in each cache directory entry which is compared-equal on each global request. It is not necessary to add any corresponding zone field in the PLAT as long as the PLAT content is invalidated each time the zone is changed for any entry in that PLAT. Otherwise, a zone field would need to be added to each PLAT entry.

The difference between the two types of PLAT entries shown in FIGS. 9 and 10 is the presence of the V/S bit 414 in a preferred type of PLAT entry which can support both read-only data (by setting the V/S bit off) an writeable data (by setting the V/S bit on). The writeable data state (V/S bit on) allows its data to be read or written. The V/S bit is set to be on at the time that a new entry is created in the PLAT, which will be in response to a global request. At this time, a store interrogate operation is executed for the entry in the partitioned cache directory having the cache hit. This involves testing its storage keys, valid bit, exclusive bit, and other cache functions. If this test is positive, then the valid store bit in the partitioned cache directory is set on for that new entry in the PLAT, otherwise it is set off. Any subsequent logical request to store into the same cache data line (while the PLAT entry remains valid) executes as a single cycle store operation. Note that any invalidate request issued to any entry in the partitioned cache is also issued to the associated PLAT to invalidate at least any corresponding PLAT entry, and may invalidate all entries in the PLAT.

Figure 11A:
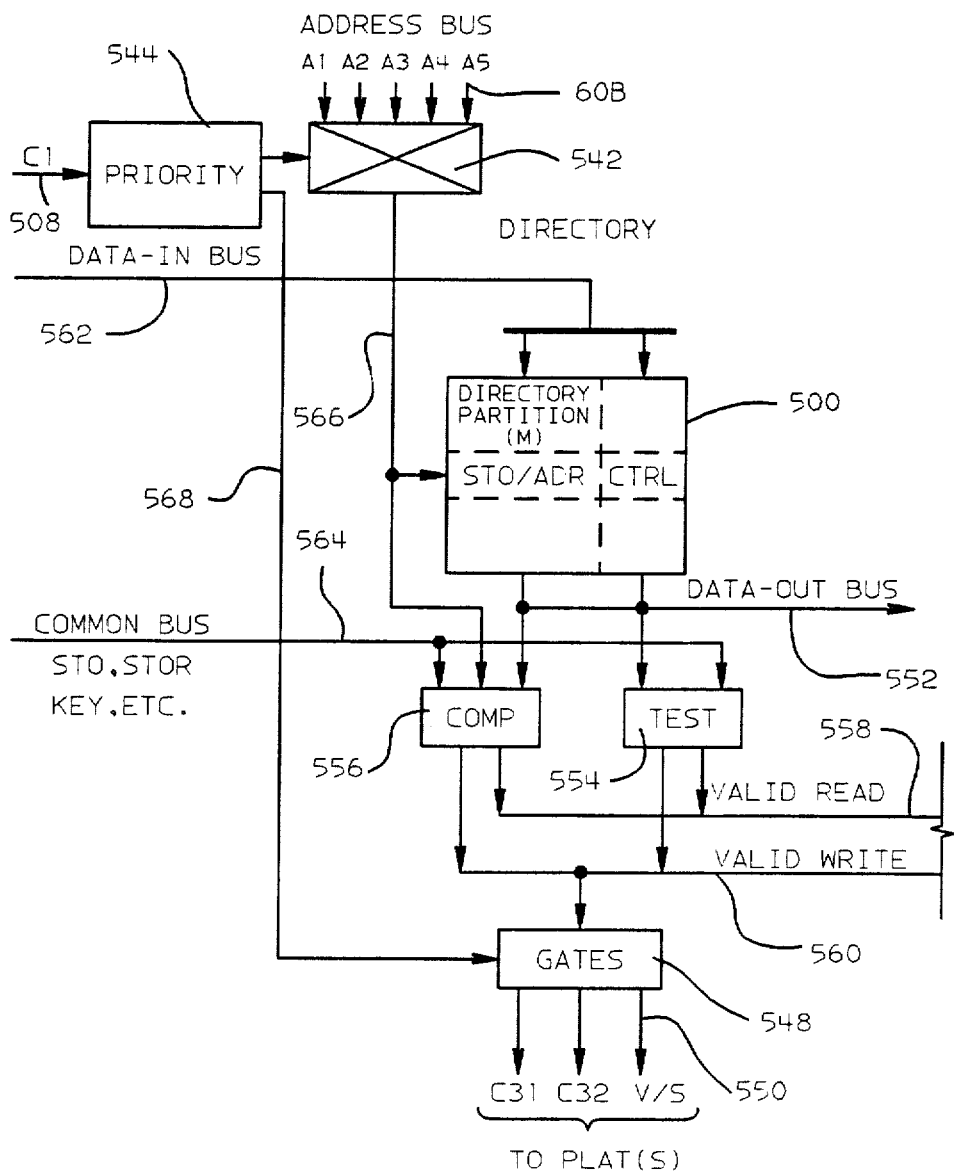
FIGS. 11A and 11B are in left to right order of a showing of a partitioned cache directory and partitioned cache data array according to the present invention and operation with a single cache partition.
Figure 11B:
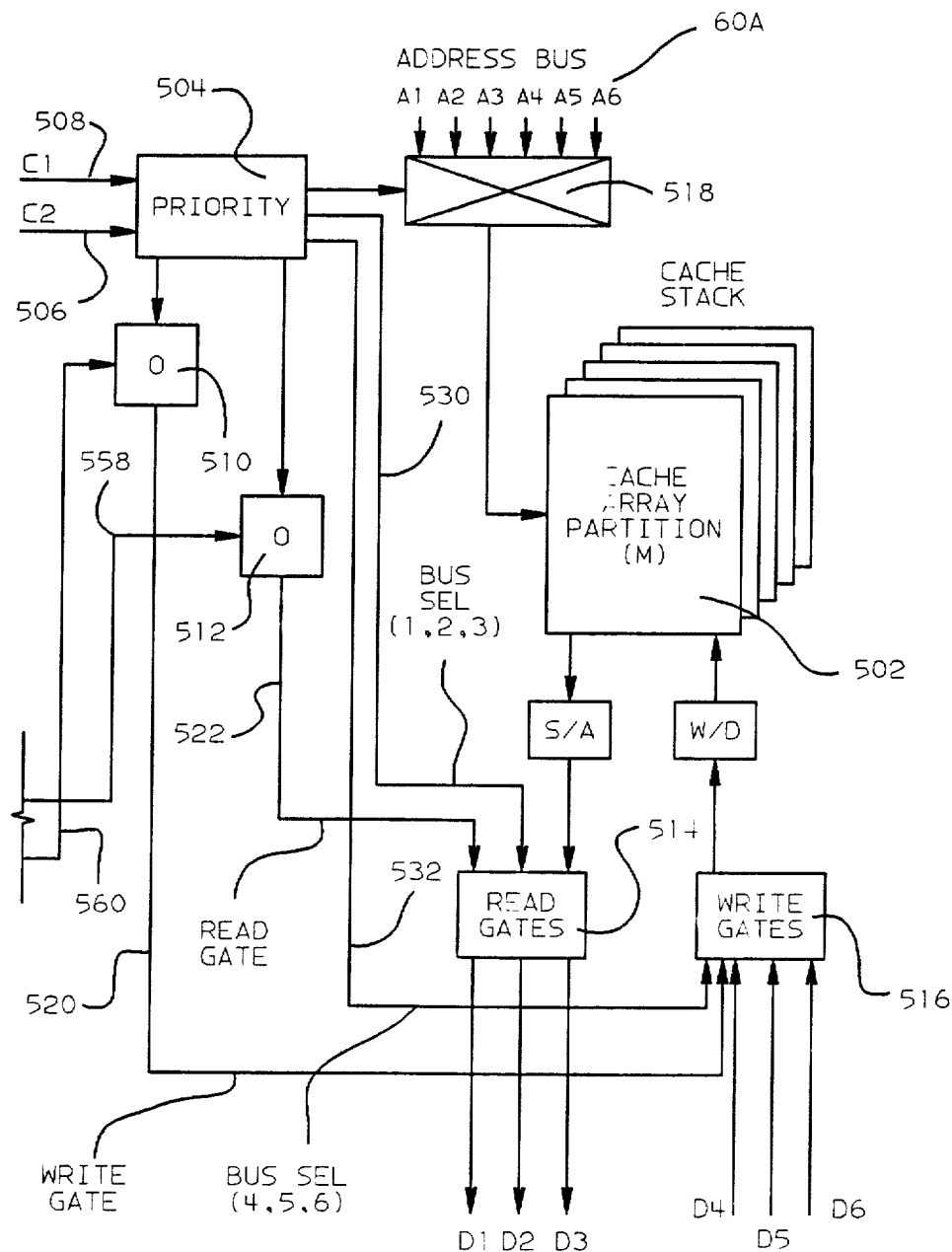

Referring now to FIGS. 11A and 11B which are viewed in left to right order, a partitioned cache is shown with its control and data flow paths. A partition directory 500 in FIG. 11A is associated with a single cache partition data array 502 shown in FIG. 11B with its stack of memory data locations. A cache priority gate 504 receives the C2 local request bus 506 and C1 global request bus 508, also shown in FIG. 4A. The output of priority logic 504 is input to OR gates 510 and 512 as well as to read gate switch and write gate switch 516. An address bus switch 518 receives an input from priority logic 504 and directs addresses to the cache array partition 502 (partition data memory). The output of OR gate 510 is a write gate select bus 520 and the output of OR gate 512 is a read gate select bus 522. OR gate 510 receives an input 560 from directory 500 and OR gate 512 receives a late select read input 558 from directory 500.

Cache directory 500 receives the CPU request address bus 60B through an address bus switch 542. The partition address decode switch 542 is controlled by priority gate 544 which has as input, only the C1 global control bus 508 that has a different line for each PLAT, e.g. five lines. Priority gate 544 also provides outputs to gates 548 which indicate the type of PLAT entry associated with the request, e.g. read-only (V/S off) or writeable (V/S on), which is indicated by which of the five C1 lines signalled the priority circuit 544. Then the outputs of gates 548 indicates by its three outputs C31, C32 and V/S in the output control bus 550 whether the global-hit cache entry is for a read-only type PLAT (C31 signal), or for a writeable type PLAT (C32 signal), and whether the V/S bit was on in the cache entry.

The output of the cache partition directory 500 consists of a data out gating bus 552 and inputs to compare logic 554 and store-interrogate test logic 556. Circuits 554 produce a valid read signal on output bus 558, and circuits 556 produce a valid write output signal on bus 560 respectively.

FIG. 11B illustrates the operation of cache partition data memory 502 when priority logic unit 504 receives a local request or global request on control bus inputs 506 or 508. If a local request is determined on the basis of C2 global request input 506, one of six addresses (from any of the six CPU sources) is switched from the address bus to the selected cache partition data array by addressing switch 518. One of the data busses D1-D6, which corresponds to the requesting one of the six C2 lines, is also selected by one of three bus select control lines 530 for read operations or one of three bus select lines 532 for writing operations. If a local request is provided by one of six C1 lines, the read gate select line 522 or the write gate select line 520 are enabled by the priority logic for local read and write requests. Thus, a cache partition data memory may execute a single cycle store or fetch operation without use of any cache partition directory. For a fetch operation, a second clock cycle cache operation is used to transfer the requested data to the requesting central processor element. For store operations, the second cache cycle is not required.

The output data bus D1 goes to an OR logic function 570 which also receives all other data busses D1 for all cache partitions for read CPU port 1. A similar circuit (identical to 570, not shown) is used for each other data bus D2 and D3. For write CPU ports, the ORing function (not shown) is accomplished by ORing busses D4, D5 and D6 to the write driver (W/D) in FIG. 11B.

A bidirectional data bus can be obtained by combining two unidirectional busses (one for read and one for write assigned to a single CPU port) into a single bidirectional bus, e.g. combining D1 and D4, D2 and D5, etc., except that the line-fetch-buffer port uses a unidirectional write bus.

If a global request is determined, the priority logic of the cache array 544 operates with a cache-port switch 542 to select one of the partitions and switch a common address to the partition directory. Each cache port also has a switch 518 to likewise connect a corresponding address bus to the data memory 502 in the same partition. For a global request, the valid read line 558 enables the selected read gates to the selected partition's data bus. The valid write line 560 enables the selected partition's write gates such that the cache data array 502 may execute the store operation on the following cycle. Thus, for a global request the first cycle of cache operation performs the data memory array access and operates the data bus switch for a fetch, and a store interrogate function for a store request. The second cycle of cache operation is used to transfer the requested data from the data memory 502 for a fetch request or to store the data in memory 502 for a store request. For global requests, one of the partition identifier lines and the valid store line is outputted by gates 548 to the C3 busses for generating a new PLAT entry.

Global requests have a higher priority than any local request in priority circuits 544 and 504. Priority for both global requests and local requests will be determined by a predetermined sequence of port positions.

Figure 12A:
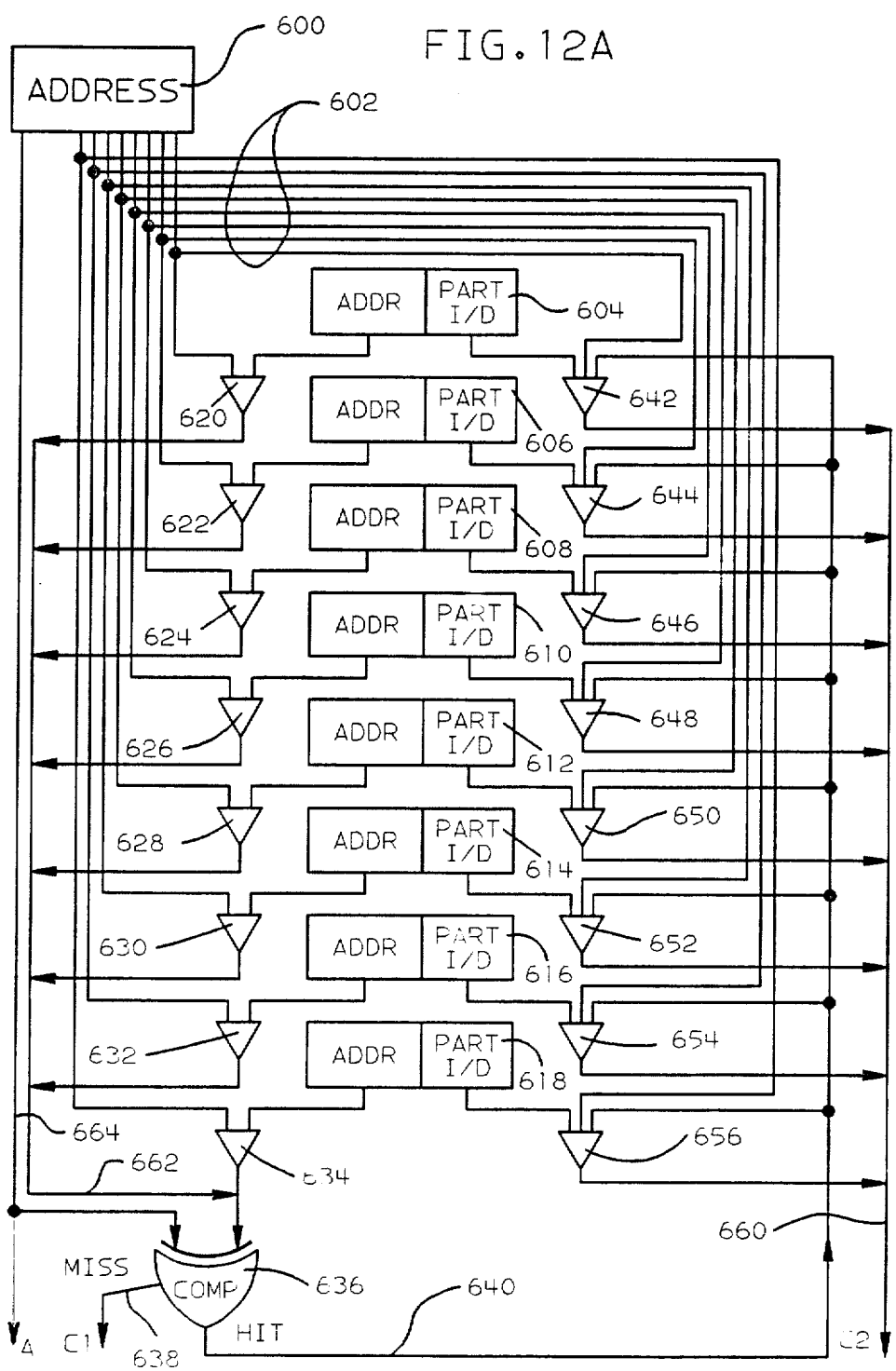
Figure 12B:
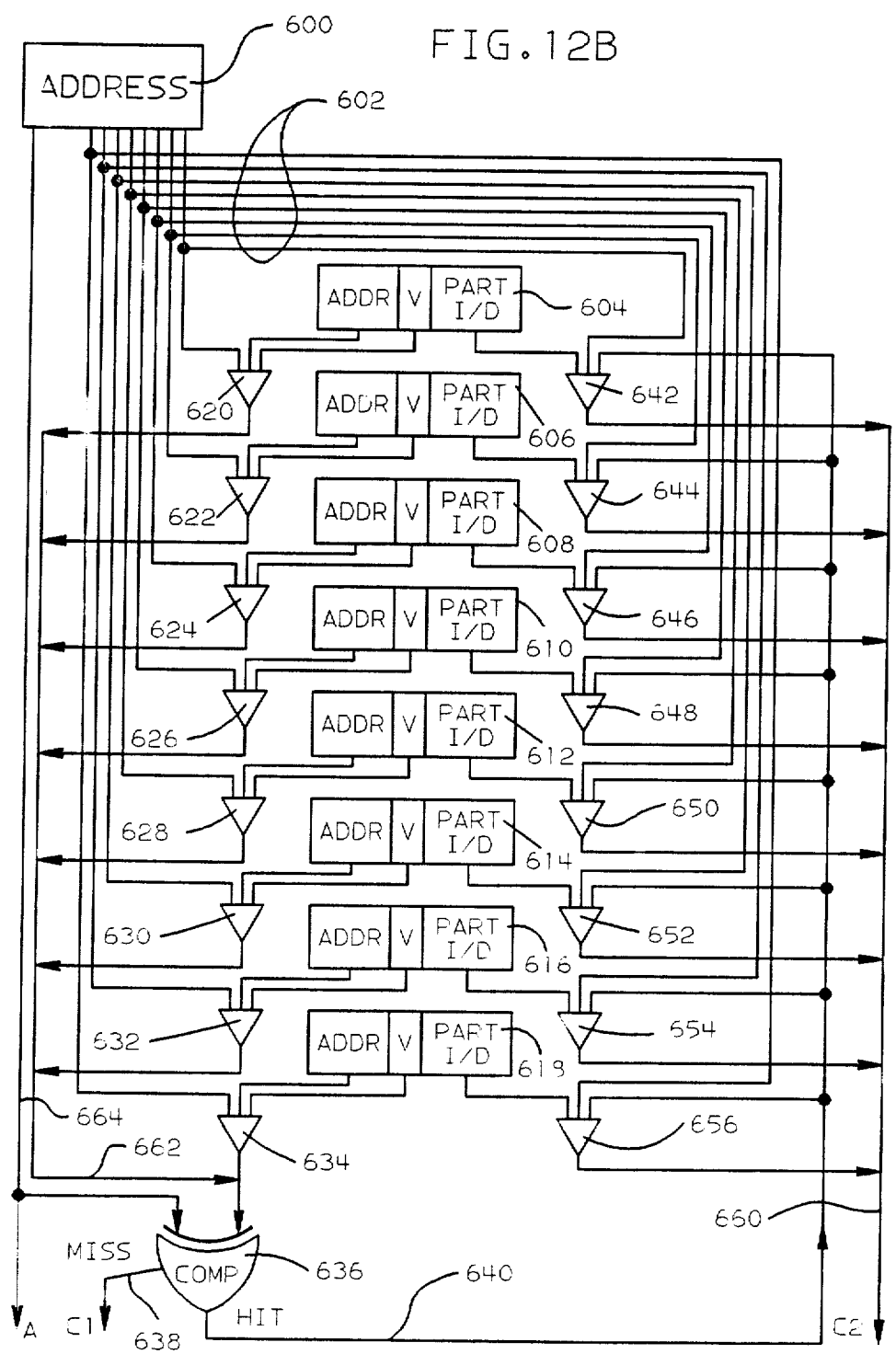

For simplicity, small PLAT structures are illustrated in FIGS. 12A and 12B, each which can store eight entries with contents as illustrated in FIGS. 9 and 10 respectively. In cache terminology this array has eight congruence class address positions, and one set associativity, Set A. This array has dimensions (8×1). Larger PLAT arrays may be constructed by replicating the components of FIGS. 12A or 12B. Each replication in the horizontal direction adds eight additional entries and one additional set; i.e. Set B (8×2), Set C (8×3), etc. Alternatively, each replication in the vertical direction adds eight additional entries, thereby increasing the congruence class addresses by eight while retaining a single set associativity, Set A. Such an array has dimension (16×1). If, for example, 32 entries were determined to be an optimum number, the PLAT array could be arranged: (8×4), (16×2), or (32×1). In any chosen arrangement of the PLAT, the required number of comparators, 636 in FIG. 12A or 12B, is equal to the set associativity, one per set.

Also referring to FIG. 12A or 12B, the CPU memory port has an address generator 600 that provides a decoded set of address lines 602 to the PLAT, the number of decoded lines are determined by the number of congruence classes in the PLAT. The address bits used to decode the congruence class select lines are determined by the partitioned L1 cache data line size, and are the "lowest-order" bits of the portion of the address normally used to address the L1 Directory, Address Bus 60B of FIG. 5. For a PLAT with eight congruence classes, three lower-order bits are used to decode eight congruence class select lines, four low-order bits to decode sixteen, etc. In cases where the generated address is obtained from a CPU adder of operand address components, the adder may generate the decoded form of the congruence class select bus 602 directly, rather than generating the encoded form which would then require the decode operation.

Referring to FIGS. 12A and 5, the CPU memory request address generator 600 provides the requested address on bus 664 and sends certain of these address bits to the cache on cache data address bus 60A, and directory address bus 60B, and to the address compare circuit 636. Also, in parallel, address generator 600 sends the eight bit congruence class select bus 602 to the PLAT. For any requesting address just one of eight lines of bus 602 is active. Depending on the active line, one of eight addresses stored in PLAT entries 604, 606, 608, 610, 612, 614, 616 or 618 is gated to a common bus 662 to the compare circuit 636 by one of gates 620, 622, 624, 626, 628, 630, 632 or 634. An equal comparison of the generated address 664 with the selected cache address 662 results in a PLAT hit on output line 640. Line 640 then provides a PLAT hit signal to gates 642, 644, 646, 648, 650, 652, 654 and 656 which combines with the active signal on congruence class select bus 602 to outgate one of the partition identifier (I/D) fields from the PLAT entries 604, 606, 608, 610, 612, 614, 616 or 618 to the C2 local request bus 660. The local request is then sent to the cache address switch on that one of the C2 lines representing this partition identifier in the group of C2 lines in the C2 local request control bus 64 from this PLAT, shown in FIGS. 4A, 4B, 4C and 4D. An unequal comparison of compare circuit 636 results in a PLAT miss signal 638 on the C1 global request bus from this PLAT. The signal line 638 is sent to the partition cache and directory as one of the global request C1 lines in global control bus 62 of FIGS. 4A, 4B, 4C and 4D.

FIG. 12B adds the valid (V) control bit to the PLAT entries of FIG. 12A and can be used for any CPU port required to handle both fetch and store memory requests. Here, the valid bit, in addition to the address field, is gated from the PLAT entries 604 through 618 by gates 620 through 634 to common bus 662. The compare circuit 636 examines the valid bit input line in addition to performing the address compare described for FIG. 12A. If the valid bit is off (for the valid state, or since valid, cache conventions usually use the up or one state for the invalid state and the down or zero state for the valid state), then compare circuit 636 determines a PLAT hit on line 640 or a PLAT miss on line 634 based on the compare operation. If the valid bit is on (invalid) then the PLAT miss line 638 is activated.

Whenever a new entry is created in the PLAT, the valid bit in that entry is set to the valid state (zero state). However, during normal CPU processing it may be necessary to set the entry invalid prior to aging the entry from the PLAT by operation of the PLAT replacement logic. Invalidating events are, for example, if a new cache line is brought into any partition in the cache, then any corresponding entry in the PLAT referring to the same data also has its valid bit changed to the invalid state. Also, in a multiple CPU environment, it is common that one CPU will request that another CPU mark a cache line invalid. In this case, any corresponding entry in a PLAT is also marked invalid. The occurrence of the need to invalidate a PLAT entry is very infrequent, but it is included for accuracy and completeness.

FIG. 12C adds the valid-store (V/S) control bit to the PLAT entries in FIG. 12B and is the preferred embodiment useable by any CPU port required to handle fetch and store CPU memory requests. Here both the valid bit (V) and valid store bit (V/S) are gated from the selected PLAT entry to the compare circuit 636. In this case, both the valid state AND the V/S state must be present, in addition to the address compare-equal state, before the PLAT hit condition is determined on line 640. If either the valid state OR the V/S state conditions are not present, then the PLAT miss line 638 is again activated. Whenever a new entry is created in the PLAT due to a PLAT miss, the store interrogate test operation (previously described) is performed at the cache directory entry having a cache hit due to a global request. If the store interrogate test is positive, then the V/S state is set in the PLAT entry being created. Subsequent CPU store requests to the same data result in PLAT hits on line 640 and do not require the store interrogate test operation to be repeated in the directory.

In normal cache operation, it is not unusual to have a valid, read only data line (i.e. the cache data unit) in the cache, as well as a valid entry in the PLAT corresponding to that cache data line. If the data line is marked "read only" in the cache, then the store interrogate test would be negative and the V/S state would be set in any PLAT corresponding entry. A subsequent CPU store request to that data line would result in a PLAT miss and a global request to the cache directory. The read-only state would then be determined, and the cache controls would request the store-privilege-state from the SCE element of FIG. 1. When the store privilege is eventually granted, the store-privilege-state is recorded in the cache directory. Then any subsequent store request to that line results in a positive indicator from the store interrogate test, and the V/S indicator is set in the PLAT entry.

FIG. 13 shows a special, fault tolerant feature of this partitioned cache. This feature tolerates major failures of the cache data array and directory components while avoiding a system outage or interruption of service to the user of the computer. Such failures would result in a degraded performance of the cache subsystem for the period of time until a repair action corrects the fault(s). For example, any chip used by any partition directory may fail, or any chip used by any partition data memory may fail. In these cases, the failed partition is logically decoupled from the cache subsystem resulting in a 12.5% loss in the cache capacity for a partitioned cache with eight partitions (note that a 12.5% loss in cache capacity does not result in a 12.5% degradation of CPU performance, but rather a substantially smaller percent due to the nature of cache performance as a function of its capacity). A second partition failure prior to the repair action would result in combined reduction in cache capacity of 25%, etc., while the CPU continues its operation. (In prior art cache subsystems, the entire CPU would be lost until the repair action on the cache was completed.) To most users a small loss in CPU performance during critical operating periods is acceptable, whereas a non-operational CPU could have severe consequences.

The basis for the fault tolerance provided in this embodiment is that cache data associated with each cache data unit (e.g. cache data line) is totally contained within each cache partition, and its address control information is totally contained within a single partition directory and may be also contained in a single PLAT. Also, a store-through type of cache is used for the partitioned cache complex in this embodiment to provide a duplicate, valid copy of all cache stored data in at least one other level of the CPU's storage hierarchy. Thus, if a major failure as described should occur, the hardware detects the failure and decouples the failed partition(s), but no data is lost. In effect, the data resident in the failed and decoupled partition(s) will be refetched from the storage hierarchy using line fetches on demand by the CPU, but into a different partition of the cache which is still functional. In essence, the data in any failed partition(s) is made to appear to the CPU as not being in the cache so that it causes a cache miss and must be fetched from the storage hierarchy, e.g. from main storage.

The operation of the fault tolerant mechanism is shown in FIG. 13. Hardware fault test logic 40 is active during all cache transactions. This includes, for example, parity testing of every accessed byte of address and data within the parity check provided on control busses 36 and 39 in a conventional manner to logic 40. An invalid partition indicating register 702 is provided to store partition-failure-indication bits, each bit corresponding to one of eight cache partitions. Should a hard failure occur in any partition, fault test hardware 40 sets on the corresponding bit in invalid partition indicating register 702 using input bus 700. Also, provided are the cache partition entry replacement circuits (LRU logic and tables 708 and LRU array 712). LRU logic 708 also monitors cache address bus 60A and cache control busses C2 and C3 to maintain an up-to-date LRU array 712. The C2 control bus indicates the active partition identifier for local requests to the cache; whereas the C3 control bus indicates the partition identifier found by a global request to the cache. This array 712 has one entry for every congruence class in all partitions of the cache data memory 34 and directory 38. Each entry in the LRU array 712 stores a partition identifier (as a partition number) of the partition selected by replacement logic 708 to be used as the next new entry in each congruence class for a new cache data line if a cache miss occurs. A conventional, set-associative cache algorithm may be used by the replacement logic in FIG. 13 to select each partition, as being analogous to the conventional selection of a particular set in a set-associative congruence class.

The LRU logic 708 also monitors the contents of the invalid partition indication register 702 on bus 704. Should any bit, or bits, be set on in 702, these bits act as an override to the LRU logic 708, such that those partitions will not be selected as input to the LRU array 712. Rather, LRU 708 will choose LRU entries to array 712 based on valid partition indicators in the register 702.

Whenever a cache miss occurs, the global request address is sent to the LRU array 712 on bus 714 to obtain a new entry in the cache. The LRU array 712 outputs to bus 716 the partition identifier of the new entry selected for the congruence class determined by the requesting address. Bus 716 sends the selected partition number to the line fetch buffer (LFB) logic 110 which stores the partition number (PN) into PN register 720. The requesting address on bus 714 is also sent to a LFB address register (AR) 724. The new line fetch is received in a LFB buffer 726. The line put away operation in the cache is next initiated by placing on A6 bus 60 the global request address stored in AR724 and placing the partition identifier on one of eight C2 lines in bus 64 selected by decoder 722, while the line of data in LFB buffer 726 is placed on the data bus from port N to the cache data-bus switch 52 of FIG. 2 and FIG. 13.

The hardware of FIG. 13 decouples the failed partition(s) from future assignment of new cache data until a repair action corrects the fault(s). The time of the repair action occurrence is chosen at the convenience of the user. At this time the contents of the invalid partition indicating register 702 are returned to the valid state.

Also, at the time of detection of a fault occurrence and the failed partition being indicated in register 702, it is possible that some entries in LRU array 712 and in any PLAT may contain the failed partition's identifier. The LRU entries having a failed partition's PN can be detected by a scan of the LRU array entries on bus 718 to enable logic 708 to detect and reset any invalid PN to a valid PN before putting the entry back into array 712. Also, all entries in all PLAT's have their V control bits set off, so that PLAT misses will force each PLAT to be filled with valid entries having their data only in functioning partitions.

Some additional features of the overall operation of the partitioned cache and PLAT according to the present invention will now be discussed.

One of the features is that a majority of store operations will now be completed in a single cache cycle. This is achieved by the elimination of the store interrogate cycle from each local request for a store operation in the cache. With this invention, the store-interrogate operation will be performed only once for any store or fetch operations when it causes a PLAT miss. At this time a new entry is created in the PLAT, and its V/S control bit is set on for that entry if subsequent store requests will be allowed to its cache data unit. A single cycle store operation is obtained on such subsequent store requests to this data by elimination of the store-interrogate cycle whenever a cache access is made by a PLAT local request for a store instruction, which reduces the average number of machine cycles per instruction, thereby increasing the processor instruction execution speed.

The fetched line put-away operation will be accomplished in parallel with one or more CPU local requests operating in other partitions of the cache. This could not be done by prior art set-associative caches which could only handle one request at a time.

This invention allows up to N number of parallel PLAT local requests to be handled in parallel during the same machine cycle to up to N number of different partitions, in which any parallel local request may be from the LFB logic 110 in FIG. 13. Thus, a data line put-away-store operation from the line fetch buffer will busy just one of the cache partitions and may be activated only for cycles when that partition may otherwise idle. This parallel LFB operation will allow larger cache lines to be used advantageously than in prior art caches to thereby improve the ratio of instructions per cache miss.

The partitioned cache with PLAT's described herein can also use a hardware section deletion function in addition to the described fault tolerant features. The hardware deletion function is used in conventional cache structures by providing a delete bit in each hardware section which is examined on each reference to that section. The delete bit is set on upon failure detection for its hardware section. The partitioned cache concept described herein can use the delete bit concept to delete sections of any partition or any PLAT without removing the remainder of the partition from use in the cache. For example, each PLAT entry may have a delete bit position in its miscellaneous field for controlling the deletion of only the failed PLAT entries to continue being used in that partition.

The PLAT housekeeping operations may include invalidating the content of all PLAT's whenever the program in the CPU switches its addressing mode, such as when the program does a "Load PSW" instruction execution, as determined by the address mode defining bits in the PSW (Program Status Word) in the System/370XA Principles of Operation (Form No. SA22-7200).

A variety of designs are available to vary the output data block size associated with the individual cache ports and data busses. Variations of the base cache design, including provisions for a central processor design which uses a separate L0 cache structure are possibilities.

While the invention has been described with reference to the preferred embodiments thereof, various modifications and changes may be made to those skilled in the art without departing from the true spirit and scope of the invention as defined by the claims hereof.

Having thus described my invention, what I claim as new and desire to secure by Letters Patent is:

1. A cache complex for operation with a CPU capable of rapidly making CPU memory requests to a system storage hierarchy, the cache complex comprising:

a cache with a plurality of independent partitions, each partition having a partition data memory and a partition cache directory having cache entries for locating data units in the partition data memory, the data memory in any partition operating independently of the data memory in any other partition;

partition look aside table (PLAT) means for temporarily storing PLAT entries for recent CPU requests having corresponding data units stored in various partition data memories of the cache;

the PLAT means generating a local request to a particular partition when a current CPU memory request is found to have a valid PLAT entry in the PLAT means (a PLAT hit), each valid PLAT entry containing at least a partition indentifier (of the particular partition that is storing data requested by a CPU memory request) and the PLAT entry also containing address components for comparison with corresponding address components in a received CPU memory request, the local request providing the partition identifier and a cache data address generated from the address components of a PLAT entry having a PLAT hit, the local request directly locating requested data in the identified partition while bypassing the cache directory to non-associatively access the requested data;

switching means connected to the partitions for steering each local request from the PLAT means to the identified partition provided in the local request;

address decoding and accessing means in each partition data memory for directly accessing the requested data by an address and partition identifier provided by each local request; and data bus means for transferring the data between the CPU and the partition data memory located in the cache by the address decoding and accessing means.

2. A cache complex as defined in claim 1, in which the switching means comprises:

address bus switching means having at least one address port, the address bus switching means connecting the address port to any partition data memory in any partition selected by a provided local request, data bus switching means having at least one data port for connecting the port to any identified partition data memory accessing a requested data location, the data bus switching means transferring the requested data between the requested data location and the CPU.

3. A cache complex as defined in claim 2, in which the cache complex further comprises:

the PLAT means generating a global request from a CPU request not found in the PLAT means for which the PLAT means indicates a PLAT miss, each global request containing a cache address for locating requested data if the data exists in any partition of the cache;

the address bus switching means transferring the global request to all directories in all partitions of the cache;

all partition directories being simultaneously searched for the global request to determine if the global request is found (global hit) by any partition directory indicating the location of the requested data in its partition data memory, or determining if the global request is not found in any directory (global miss);

the data bus switching means transferring the requested data on the data bus means between the requesting CPU and the indicated location having a global hit in a partition data memory;

output bus means for signalling to the PLAT means the partition identifier of the partition having the global hit, and the PLAT means generating a new PLAT entry for enabling the PLAT means to subsequently generate local requests for any data in a data unit in the partition data memory having the requested data.

4. A cache complex for operation with a CPU capable of rapidly making CPU memory requests from a plurality of CPU memory request ports which are allowed to make simultaneous requests, the CPU memory requests being to a single storage hierarchy, the cache complex comprising:

a cache with a plurality of independent partitions, each partition having a partition data memory and a partition cache directory having cache entries for locating data units in the partition data memory, the data memory in any partition operating independently of the data memory in another partition;

a plurality of partition look aside table (PLAT) means connected to the plurality of CPU memory request ports, each PLAT means connected to one or more CPU memory request ports;

each PLAT means temporarily storing PLAT entries for CPU requests recently received by the PLAT means, each valid PLAT entry having a corresponding data unit stored in any partition of the cache;

plural address bus means connected with the plural PLAT means for generating and transmitting local requests in parallel to the cache as CPU memory requests that have corresponding valid PLAT entries found in the PLAT means (PLAT hits), each valid PLAT entry containing at least a partition identifier of the partition storing the data represented by the PLAT entry, and the PLAT entry also containing address components for comparison with corresponding address components in received CPU memory requests, each local request transmitting the partition identifier and a cache data address of the found PLAT entry for directly locating requested data in the identified partition of the cache without accessing the cache directory to non-associatively access the requested data;

switching means for connecting the address bus means in parallel to the cache partitions for directly steering each local request from any of the FLAT means to an addressed location of requested data in any identified partition;

plural data bus means connected to the switching means for transferring requested data in parallel between the CPU ports and addressed location in the identified partitions.

5. A cache complex as defined in claim 1 or 4, in which each PLAT entry further comprises:

means for setting a control field including a valid bit position (V) to a valid state in a PLAT entry being generated for a CPU memory request when the CPU memory request is determined to be allowable.

6. A cache complex as defined in claim 1 or 4, further comprising:

store-interrogate test means for checking the allowability of a CPU memory request to access data being addressed, means for performing a store-interrogate test for a CPU memory request before generating a PLAT entry for the request;

means for setting a valid-store field (V/S) for a PLAT entry being generated to indicate the store-interrogate test was successfully performed for the CPU memory request.

7. A cache complex as defined in claim 1 or 4, in which each PLAT entry further comprises:

a field for receiving bits of a CPU address provided with the CPU memory request causing the generation of the PLAT entry, in which the bits have a higher order in the address than other bits of the address used for locating any corresponding entry in the cache directory.

8. A cache complex as defined in claim 1 or 4, in which each PLAT entry also comprises:

a representation of a segment table origin (STO) specifying a memory location of a segment table defining a virtual address space containing the CPU memory request causing generation of the PLAT entry.

9. A cache complex as defined in claim 1 or 4, in which each entry in the cache directory also comprises:

a zone identifier field for specifying a contiguous range of absolute addresses in main storage assigned for the use of one of plural operating system programs concurrently executable by the PPU, means for comparing the zone field in each cache directory entry with a zone field provided by a CPU memory request having a global request from a PLAT, and the compare means signalling a cache hit whenever the zone fields and selected compared fields compare equal to enable the creation of a new PLAT entry, but signalling a cache miss whenever the zone fields compare unequal to provide a cache miss to enable the creation of a new cache entry and a new FLAT entry and a line fetch request to a system hierarchy.

10. A cache complex as defined in claim 1 or 4, in which the cache complex further comprises:

a plurality of priority logic means respectively connected to the switching means to determine priority among plural local requests simultaneously directed to any cache partition.

11. A cache complex as defined in claim 4, in which the cache complex further comprises:

means connecting a plurality of CPU ports to one PLAT for accessing the cache.

12. A cache complex as defined in claim 4, in which the cache complex further comprises:

means connecting a plurality of PLATs to any one CPU port for accessing the cache.

13. A cache complex as defined in claim 4, in which the cache complex further comprises:

global bus means associated with the PLAT means for transferring a global request generated by the PLAT means when a received CPU request is not found to have a corresponding valid PLAT entry in the PLAT means (PLAT miss), logic means connecting the global bus means and the CPU request to all partition cache directories and all partition data memories, all partition directories simultaneously determining if the CPU memory request is represented in any cache partition data array, compare means associated with each partition in the cache directory for indicating when the CPU memory request is found in the partition by providing a cache hit signal or if it is not found in the partition by providing a cache miss signal, late gating means for each partition for transferring an output from any partition's cache data memory upon receiving a hit signal from the compare means in the same partition to associatively control the accessing of the requested data in the partition by the switching means connecting the late gating means to a cache data port in response to a cache hit signal for set-associatively outputting the cache data for a global request, the data bus switching means directly transferring the output of any partition's cache data memory to a cache data port upon receiving a local request to bypass the late gating means and to non-associatively access the cache data location in response to a local request.

14. A cache complex as defined in claim 13, in which the data bus means further comprises:

unidirectional data bus means for only transferring data from the cache to a CPU port that only issues CPU read memory requests, the data bus means providing a data path from a cache partition through the switch means to the CPU port.

15. A cache complex as defined in claim 14, in which the CPU port further comprises:

instruction fetch request means for issuing read memory requests for next instructions for the CFU to execute;

a PLAT means associated with the instruction fetch request means, the PLAT means containing entries for instruction read memory requests; and unidirectional data bus means for only transferring instructions from a CPU port to the cache that only issues CPU instruction fetch memory requests, the data bus means providing a data path to a cache partition through the switch means from the CPU port.

16. A cache complex as defined in claim 13, in which the cache complex support for a global request further comprises:

partition identifier generating means with each partition for being gated by the output of the late gating means of the partition to provide the partition identifier of a respective partition to the PLATA associated with the CPU request providing the global request when a cache directory hit occurs in the respective partition;

an output control bus connected to the partition identifier generating means for transferring any outputted partition identifier to the PLAT associated with the CPU request that provided the global request for writing the received partition identifier into the PLAT entry being created for the CPU request.

17. A cache complex as defined in claim 13, in which the cache complex supporting a global request further comprises:

global bus means associated with the PLAT means for generating and transferring a global request when a received CPU request is not found to have a valid PLAT entry in the PLAT means (PLAT miss), logic means connecting the global bus means and the CPU request to the partition cache directory and partition data memory in all partitions in the cache to simultaneously address the cache directories in all partitions to determine if the CPU request is represented in any cache partition, compare means associated with each partition cache directory for indicating when the CPU request is found in the partition by providing a cache hit signal, means for generating a cache miss signal if no cache hit signal is indicated for any partition, the data bus switching means connecting the data bus means to the partition data memory having a cache hit for writing CPU data from the CPU requesting port into the addressed location in the partition data memory.

18. A cache complex as defined in claim 17, in which the data bus means further comprises:

unidirectional data bus means for only transferring data to an addressed location in a partition data memory from a CPU port that only issues CPU write memory requests, the bus means being connected by the data bus switching means to a cache partition having requested data found therein.

19. A cache complex as defined in claim 4, further comprising:

cache entry replacement logic means for selecting in any partition of the cache a next cache directory entry and a corresponding cache data location for replacement when a global request has no cache hit in any partition, means for accessing a system hierarchy for the requested data, means for storing a new cache directory entry in the next cache directory entry selected by the cache entry replacement logic means, PLAT entry replacement logic means for selecting a next replaceable PLAT entry in the PLAT associated with the CPU port making the memory request having the cache miss, means for making the next replaceable PLAT entry a new FLAT entry, including writing into the new PLAT entry an identifier of the partition containing the new cache directory entry.

20. A cache complex as defined in claim 1, further comprising:

PLAT entry creating means operating in response to a PLAT miss for a CPU memory request of either a fetch or store type, the PLAT entry creating means including PLAT entry replacement logic means for selecting a next replacement PLAT entry in the PLAT, means for storing a plurality of fields in the next replacement PLAT entry, including an address field for locating a new cache data unit assigned in any cache partition by cache replacement logic for receiving the data for the CPU memory request, a partition identifier field for indicating the partition containing the new cache data unit, a control field, including a valid bit position for indicating that the new PLAT entry is valid when it is created, a valid-store bit position for indicating that the cache data unit represented by the new PLAT entry can be stored into if set on or cannot be stored into if set off, store-interrogate logic means in the CPU for testing the ability of the COU to store into any memory data unit being requested, the store-interrogate logic means testing the CPU memory request of either a fetch or store type on whether the request is to be allowed to access any data, the store-interrogate logic means providing a valid-store signal when the CPU memory request is allowed to be made, the PLAT entry creating means setting on the valid bit position (v) in the new PLAT entry while the entry is being created, and setting the valid-store bit position (V/S) to correspond to the state of the valid-store signal provided by the CPU to indicate whether the cache data unit represented by the new PLAT entry can be stored into or not, and setting the address field in the new PLAT entry and the partition identifier field assigned for the new cache data unit.

21. A cache complex as defined in claim 1 or 4, further comprising:

line-fetch-buffer means for receiving a newly fetched line of data or instructions from a system storage hierarchy in response to a global request to the cache having a cache miss in all partitions of the cache, cache-entry-replacement means for selecting a replacement partition identifier for a replacement entry in any partition of the cache, means with the line-fetch-buffer means for generating a local request to the cache using the replacement partition identifier to access a corresponding partition directory at a cache location replacement address determined by the address of the CPU memory request causing he global request having the cache miss being responded to by obtaining the fetched line of data or instructions, local request bus means for transferring the fetched line from the line-fetch-buffer means to the cache location replacement address in parallel with any other existing local request from any PLAT accessing a different partition in the cache, PLAT-replacement-entry selection means for assigning the CPU memory request requiring the fetched line to a next replacement entry in the PLAT, and means for generating a PLAT entry representing the CPU memory request in the next replacement entry.

22. A cache complex as defined in claim 1 or 4, further comprising:

fault-test-logic means for determining if any partition has failed in the cache, invalid-partition-indicating register means having a partition-indicating location set by the fault-test-logic means for each partition that fails, means for invalidating in each PLAT all entries for each cache partition identified as having failed in the invalid-partition-indicating register means.

23. A cache complex as defined in claim 1 or 4, further comprising:

fault-test-logic means for determining if any partition has failed in the cache, invalid-partition-indicating register means having a partition-indicating location set by the fault test logic means for each partition that fails, means for invalidating all entries in each PLAT whenever the invalid-partition-indicating register means identifies any cache partition as having failed.

24. A cache complex as defined in claim 1 or 4, further comprising:

fault-test-logic means for determining if any partition has failed in the cache, invalid-partition-indicating register means having a partition-indicating location set by the fault-test-logic means for each partition that fails, means for invalidating the entries in the cache directory of any partition that failed, and means for invalidating the entries in each PLAT, cache-replacement-entry-selection means connected to the invalid-partition-indicating register means for assigning new CPU memory requests to selected partitions that have not failed in cache.

* * * * *